United States Patent
Tsugimura

(10) Patent No.: US 9,374,500 B2
(45) Date of Patent: Jun. 21, 2016

(54) IMAGE PROCESSING APPARATUS CONFIGURED TO EXECUTE CORRECTION ON SCANNED IMAGE

(71) Applicant: BROTHER KOGYO KABUSHIKI KAISHA, Nagoya-shi, Aichi-ken (JP)

(72) Inventor: Koichi Tsugimura, Nagoya (JP)

(73) Assignee: BROTHER KOGYO KABUSHIKI KAISHA, Nagoya-Shi, Aichi (JP)

( * ) Notice: Subject to any disclaimer, the term of this patent is extended or adjusted under 35 U.S.C. 154(b) by 0 days.

(21) Appl. No.: 14/669,913

(22) Filed: Mar. 26, 2015

(65) Prior Publication Data
US 2015/0281519 A1 Oct. 1, 2015

(30) Foreign Application Priority Data
Mar. 31, 2014 (JP) ................. 2014-074699

(51) Int. Cl.
*H04N 1/04* (2006.01)
*H04N 1/409* (2006.01)

(52) U.S. Cl.
CPC ................. *H04N 1/4092* (2013.01)

(58) Field of Classification Search
CPC .......... G06K 9/4604; G06K 2009/363; G06K 2209/01; G06K 9/2054; G06K 9/209; G06K 9/3275; G06K 9/3283; G06K 7/10861; G06K 7/1456; G06K 9/00; G06K 9/00248; G06K 9/00281; H04N 2201/0081; H04N 1/00037
USPC .......... 382/199, 103, 145, 256, 276, 274, 275, 382/289; 358/1.9, 488, 1.12, 1.2, 448, 474, 358/504, 518, 521, 525
See application file for complete search history.

(56) References Cited

U.S. PATENT DOCUMENTS

| 6,466,340 B1 | 10/2002 | Washio |
| 6,782,143 B1* | 8/2004 | Dube et al. .................... 382/300 |
| 2007/0097381 A1* | 5/2007 | Tobiason ............... G01B 11/25 356/604 |
| 2008/0267502 A1 | 10/2008 | Youngers et al. |
| 2009/0185240 A1* | 7/2009 | Kato et al. ..................... 358/474 |
| 2010/0149603 A1* | 6/2010 | Maeda .......................... 358/449 |
| 2010/0239165 A1* | 9/2010 | Wu et al. ....................... 382/176 |
| 2012/0263394 A1 | 10/2012 | Fujiwara et al. |
| 2012/0270162 A1* | 10/2012 | Dahlhielm .............. F23N 1/002 431/12 |

(Continued)

FOREIGN PATENT DOCUMENTS

| JP | 11-252351 A | 9/1999 |
| JP | 2001-223891 A | 8/2001 |

(Continued)

*Primary Examiner* — Negussie Worku
(74) *Attorney, Agent, or Firm* — Merchant & Gould P.C.

(57) ABSTRACT

An image processing apparatus includes a processor and a memory storing computer-readable instructions therein. The computer-readable instructions, when executed by the processor, cause the image processing apparatus to: acquire scan data from a scan data generating unit, the scan data generating unit being configured to generate the scan data by optically reading a sheet being conveyed, the scan data representing a scanned image that includes an image indicative of the sheet, the sheet having a plurality of sides; detect a plurality of edge lines from the scanned image by analyzing the scan data, the plurality of edge lines representing the plurality of sides, respectively; determine whether the plurality of edge lines include a non-linear edge line; and correct, when the plurality of edge lines is determined to include a non-linear edge line, the scan data so that the non-linear edge line is changed to a linear edge line.

18 Claims, 13 Drawing Sheets

(56) References Cited

U.S. PATENT DOCUMENTS

2014/0126811 A1* 5/2014 Ihara .............................. 382/165
2015/0256696 A1* 9/2015 Wada et al. .................... 358/474
2015/0281513 A1* 10/2015 Ozawa .......................... 358/474

FOREIGN PATENT DOCUMENTS

| JP | 2005-304011 A | 10/2005 |
| JP | 2011-097251 A | 5/2011 |

* cited by examiner

P3 (ECa→Sg1)
P2 (EDa→Sg3)
P1(EA→SgA)
AsA
90°
Dg
Ag

P6 (ECb→Sg2)
P5 (EDb→Sg4)
P4(EB→SgB)
AsB
90°
Dg
Ag

IMAGE PROCESSING APPARATUS CONFIGURED TO EXECUTE CORRECTION ON SCANNED IMAGE

CROSS REFERENCE TO RELATED APPLICATION

This application claims priority from Japanese Patent Application No. 2014-074699 filed Mar. 31, 2014. The entire content of the priority application is incorporated herein by reference.

TECHNICAL FIELD

The present disclosure relates to an image processing apparatus.

BACKGROUND

Conventionally, a variety of processing has performed on scan data generated by scanners. For example, when an original document has been placed obliquely onto a document platen, scan data representing the oblique document is generated. Processing has been proposed which calculates the inclination of the original document by detecting edges from this sort of image data, and corrects the tilting of the original document on the basis of the calculated inclination.

SUMMARY

Conventional scanners include a conveyance mechanism for conveying sheets, and a sensor for optically reading sheets being conveyed. In some cases, it is difficult for the conventional scanner to obtain a scanned image that correctly represents the sheet due to the characteristics of the sheet, the structure of the conveyance mechanism, or the like.

A principal benefit of the present disclosure is that, when a sheet being conveyed is optically read, image data that properly represents the sheet can be generated.

It is therefore an object of the disclosure to solve at least a part of problems described above.

In order to attain the above and other objects, the disclosure provides an image processing apparatus including a processor and a memory storing computer-readable instructions therein. The computer-readable instructions, when executed by the processor, cause the image processing apparatus to: acquire scan data from a scan data generating unit, the scan data generating unit being configured to generate the scan data by optically reading a sheet being conveyed, the scan data representing a scanned image that includes an image indicative of the sheet, the sheet having a plurality of sides; detect a plurality of edge lines from the scanned image by analyzing the scan data, the plurality of edge lines representing the plurality of sides, respectively; determine whether the plurality of edge lines include a non-linear edge line; and correct, when the plurality of edge lines is determined to include a non-linear edge line, the scan data so that the non-linear edge line is changed to a linear edge line.

According to another aspect, the disclosure provides a non-transitory computer-readable storage medium storing a set of program instructions executed by a computer. The program instructions include: acquiring scan data from a scan data generating unit, the scan data generating unit being configured to generate the scan data by optically reading a sheet being conveyed, the scan data representing a scanned image that includes an image indicative of the sheet, the sheet having a plurality of sides; detecting a plurality of edge lines from the scanned image by analyzing the scan data, the plurality of edge lines representing the plurality of sides, respectively; determining whether the plurality of edge lines include a non-linear edge line; and correcting, when the plurality of edge lines is determined to include a non-linear edge line, the scan data so that the non-linear edge line is changed to a linear edge line.

According to another aspect, the disclosure provides a non-transitory computer-readable storage medium storing a set of program instructions executed by a computer. The program instructions include: acquiring scan data from a scan data generating unit, the scan data generating unit being configured to generate the scan data by optically reading a sheet being conveyed, the scan data representing a scanned image that includes an image indicative of the sheet, the sheet having a plurality of sides; detecting a plurality of edge lines from the scanned image by analyzing the scan data, the plurality of edge lines representing the plurality of sides, respectively, the plurality of edge lines including a pair of first edge lines and a pair of second edge lines, the pair of first edge lines representing a pair of first sides that extend in a first direction, the first direction corresponding to a conveying direction in which the sheet is to be conveyed, each of the pair of first edge lines being a non-linear edge line, the pair of second edge lines representing a pair of second sides that extend in a second direction corresponding to a direction perpendicular to the conveying direction, each of the pair of second edge lines being a straight line that connects the pair of first edge lines, one edge line of the pair of second edge lines extending in a third direction, another edge line of the pair of second edge lines extending in a fourth direction different from the third direction; determining whether the plurality of edge lines include a non-linear edge line; and correcting, when the plurality of edge lines is determined to include a non-linear edge line, the scan data by: changing the pair of second edge lines to a pair of linear edge lines parallel to each other by aligning the another edge line with the one edge line; and changing the pair of first edge lines to a pair of linear edge lines each connecting the one edge line and the another edge line that has been aligned.

BRIEF DESCRIPTION OF THE DRAWINGS

The particular features and advantages of the disclosure as well as other objects will become apparent from the following description taken in connection with the accompanying drawings, in which:

FIG. 5A is a graph showing an example of a result obtained by executing Hough transformation on a first region;

FIG. 5B is a graph showing an example of a result obtained by executing Hough transformation on a second region;

DETAILED DESCRIPTION

A. First Embodiment

Figure 1:
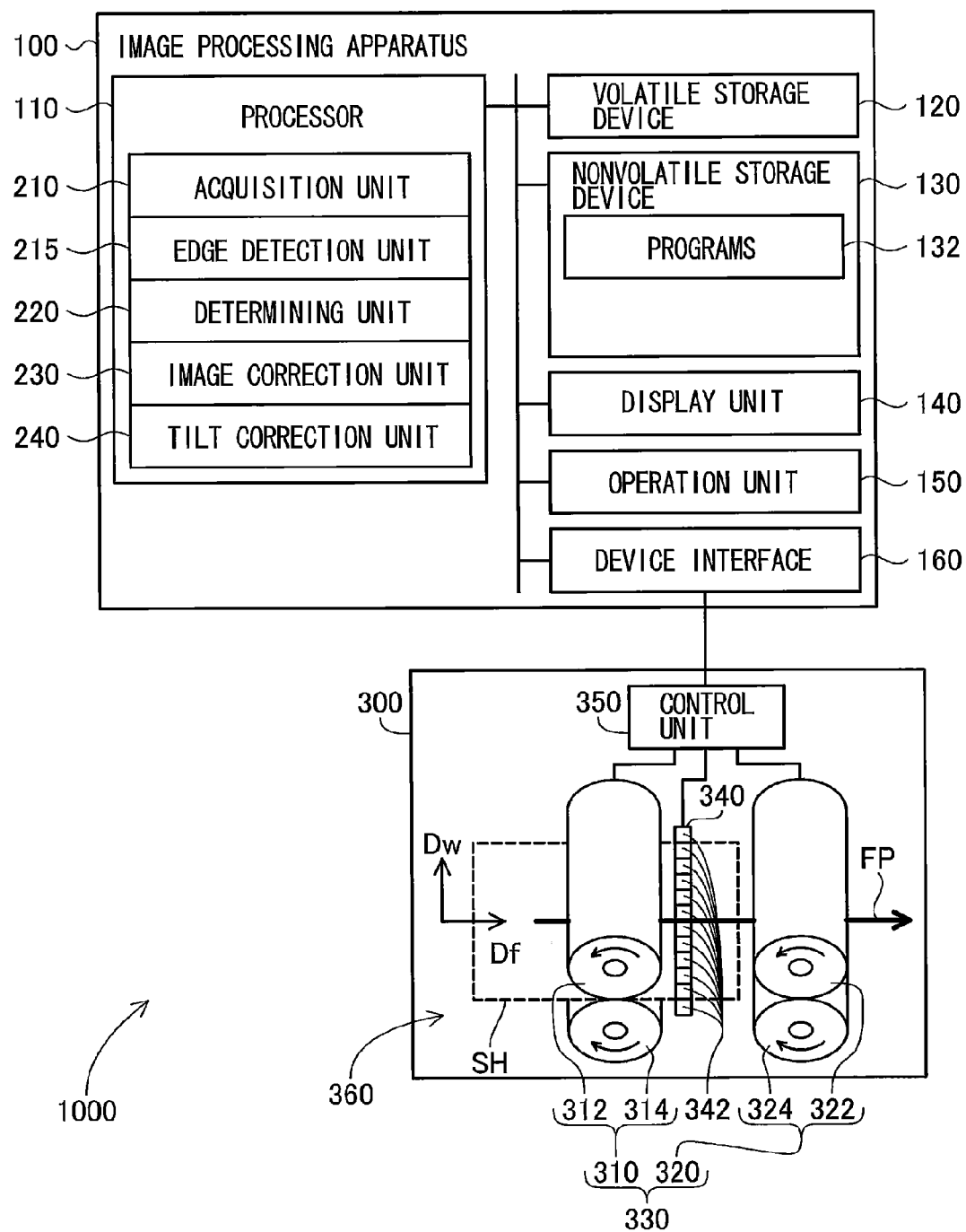
FIG. 1 is an explanatory diagram of a scan system according to a first embodiment.

FIG. 1 is an explanatory drawing showing a scanning system 1000 as a first embodiment. The scanning system 1000 includes an image processing apparatus 100 and a scanner device 300 connected to the image processing apparatus 100.

The image processing apparatus 100 is a computer, such as a personal computer, and includes a processor 110, a volatile storage device 120, a nonvolatile storage device 130, a display unit 140, an operation unit 150, and a device interface 160.

The processor 110 is a device configured to perform data processing, such as a so-called CPU. The volatile storage device 120 is a so-called DRAM. The nonvolatile storage device 130 is a so-called flash memory and stores programs 132.

The processor 110 configured to implement various functions by executing the programs 132. In the first embodiment, the processor 110 implements the functions of respective processing units; specifically, an acquisition unit 210, an edge detection unit 215, a determining unit 220, an image correction unit 230, and a tilt correction unit 240. The respective processing units are described in detail below. In addition, the processor 110 temporarily stores a variety of intermediate data used in executing the programs 132 and the like in the storage device, such as the volatile storage device 120 or the nonvolatile storage device 130.

The display unit 140 is a device on which images are displayed, such as a liquid crystal display. The operation unit 150 is a device configured to accept operations from a user, such as a touch panel disposed on top of the display unit 140 and overlapping with the display unit 140. The operation unit 150 allows a user to specify various commands, such as a command to begin scan processing. The device interface 160 is an interface for communicating with other devices, such as a so-called USB interface or IEEE 802.11 wireless interface. The image processing apparatus 100 is capable of communicating with the scanner device 300 via the device interface 160.

The scanner device 300 includes a conveyance mechanism 330, a sensor 340, and a control unit 350. The control unit 350 controls the conveyance mechanism 330 and the sensor 340 to optically read a sheet SH being conveyed, thereby generating scan data representing a scanned image. The sheets SH may be a variety of sheet-shaped items, such as printed matter, driver's licenses, and credit cards. The control unit 350 may contain special-purpose electronic circuits, such as an ASIC (application-specific integrated circuit). Further, a computer containing a processor and a storage device may be used as the control unit 350, instead of the special-purpose electronic circuits.

The conveyance mechanism 330 includes a first pair of rollers 310 and a second pair of rollers 320 to hold and convey the sheets SH. The first pair of rollers 310 is disposed upstream from the sensor 340 in a conveyance direction Df, and the second pair of rollers 320 is disposed downstream from the sensor 340 in the conveyance direction Df. The first pair of rollers 310 includes a driving roller 312 and a following roller 314. The driving roller 312 is driven by a motor (not shown), and the following roller 314 rotates in response to rotation of the driving roller 312. The second pair of rollers 320 includes a driving roller 322 and a following roller 324. The driving roller 322 is driven by a motor (not shown), and the following roller 324 rotates in response to rotation of the driving roller 322.

A sheet SH is held by the first pair of rollers 310 and conveyed in the conveyance direction Df along a conveyance path FP. Upon reaching the second pair of rollers 320, the sheet SH is held by the two roller pairs 310 and 320 and conveyed in the conveyance direction Df along the conveyance path FP. When a sheet SH separates from the first pair of rollers 310, the sheet SH is held by the second roller pair and conveyed on the conveyance path FP in the conveyance direction Df. Alternatively, a plate member may be utilized instead of the following rollers 314 and 324, with the sheet SH being held by the driving rollers 312 and 322 and the plate member.

The sensor 340 is an image sensor configured to output image signal representing the sheet SH by optically reading in the sheet SH being conveyed, such as a CCD sensor or a CMOS sensor. The sensor 340 includes multiple photodetectors 342 disposed along in the shape of a line extending in a direction which intersects with the conveyance direction Df. In the first embodiment, the direction intersecting the conveyance direction Df is a direction perpendicular to the conveyance direction Df, and is referred to below as the specific width direction Dw. The photodetectors 342 cover a prescribed area having a specific width in the specific width direction Dw. The specific width is larger than or equal to a width of prescribed size of sheet SH. The control unit 350 processes the image signal from the sensor 340 to generate scan data representing an image that has been optically read, that is, the scanned image. Combination of the conveyance mechanism 330, the sensor 340, and the control unit 350 is configured to optically read in the sheet SH being conveyed and generate scan data representing a scanned image.

Figure 2:
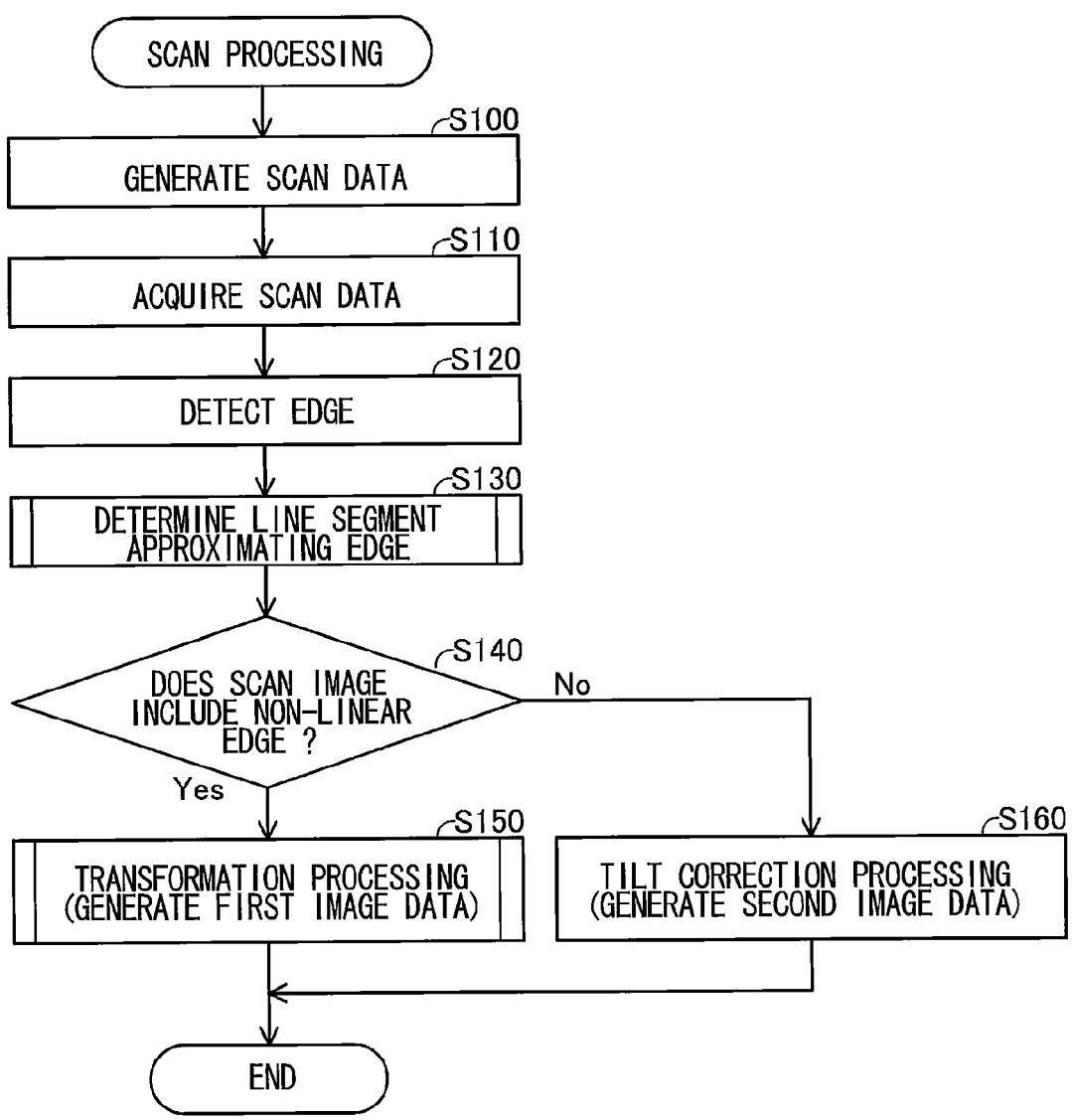
FIG. 2 is a flowchart illustrating steps in a scan processing.

In a scan processing of the first embodiment shown in FIG. 2, the scanner device 300 generates scan data and transmits the generated scan data to the image processing apparatus 100, and then the image processing apparatus 100 corrects the transmitted scan data. The processor 110 of the image processing apparatus 100 begins scan processing upon receiving a command to start the scan processing from a user via the operation unit 150. In such a case, the acquisition unit 210 of the processor 110 transmits to the scanner device 300 a command to generate scan data. Alternatively, the control unit 350 of the scanner device 300 may start the scan processing in response to a user having operated operating buttons (not shown) on the scanner device 300.

In step S100, the control unit 350 of the scanner device 300 generates scan data by causing the sensor 340 to optically read the sheet SH. FIG. 3A illustrates an example in which the sheet SH is an object having a substantially-rectangular shape, such as a credit card. Though not shown in the figure, various characters, symbols, and the like are depicted on the sheet SH. The sheet SH has four sides SA, SB, SC, and SD which form the outline of the substantially rectangular shape of the sheet SH. The conveyance direction Df and the specific width direction Dw are shown in the FIG. 3A. Of the four sides, the first side SA is the side located at the upstream position in the conveyance direction Df, and the second side SB is the side located on the downstream position in the conveyance direction Df. Both of these sides SA and SB extend in a direction substantially perpendicular to the conveyance direction Df. The third side SC is the side located at the downstream position in the specific width direction Dw, and the fourth side SD is the side located at the upstream position in the specific width direction Dw. Both of these sides SC and SD extend in a direction substantially parallel to the conveyance direction Df.

These sides SA, SB, SC, and SD are all straight lines. The two mutually opposing sides SA and SB are parallel to each other. The other two mutually opposing sides SC and SD are parallel to each other and perpendicular to the two sides SA and SB. It is acceptable for the four corners of the rectangular shape formed by these sides SA, SB, SC, and SD to be rounded. However, it is possible for the sheet SH to be disposed obliquely to the conveyance path FP (in FIG. 1). Accordingly, there is a possibility that the four sides SA, SB, SC, and SD are oriented obliquely to the conveyance direction Df.

Figure 3B:
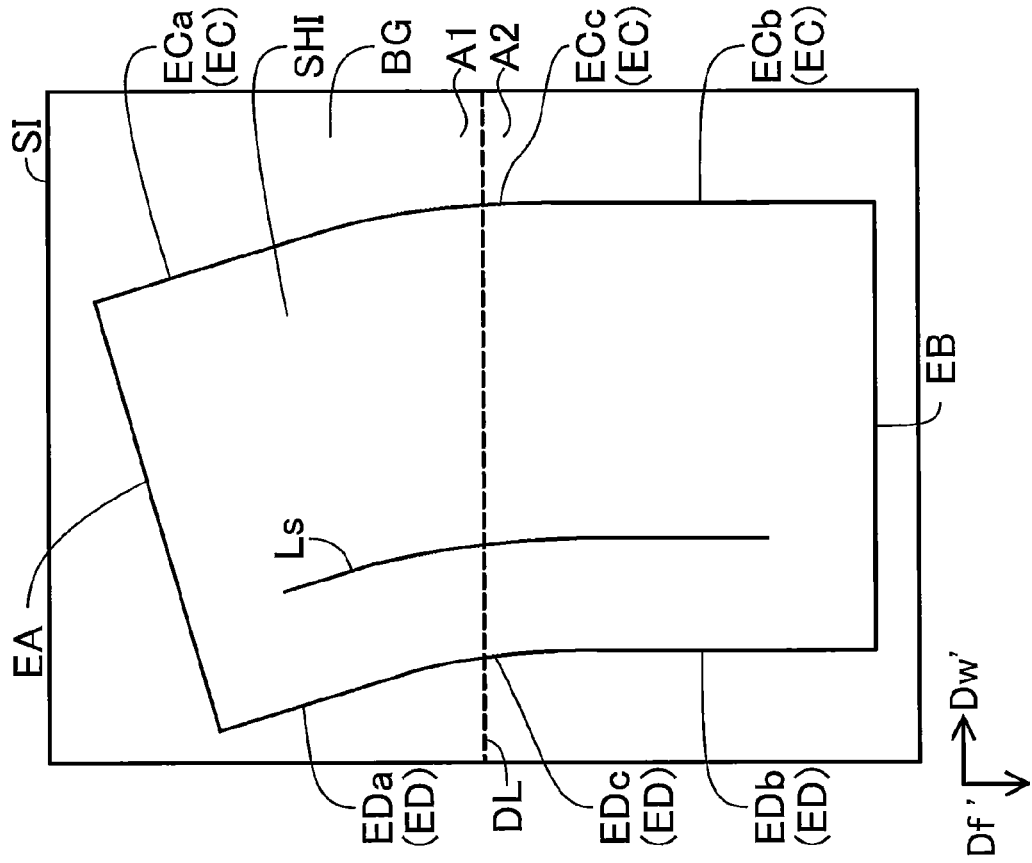
FIG. 3B is an explanatory diagram showing an example of a scanned image.
Figure 3A:
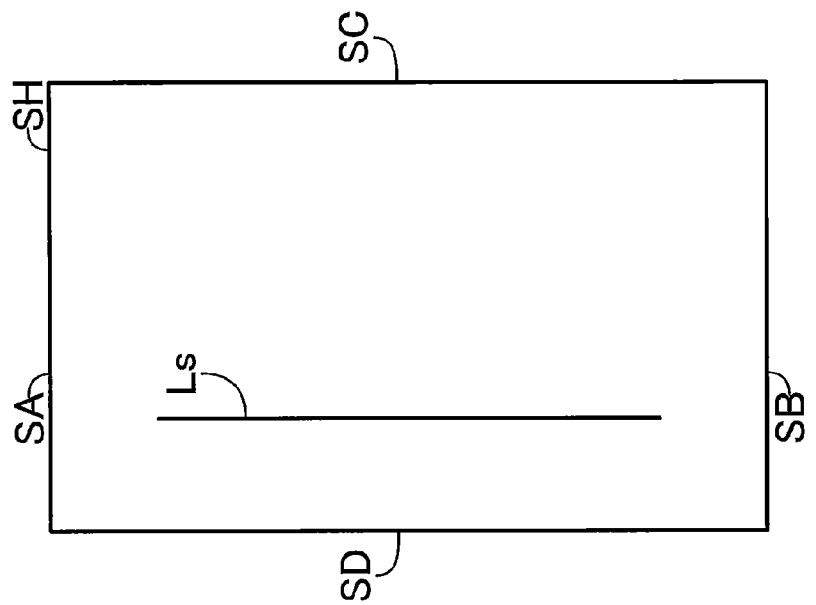
FIG. 3A is an explanatory diagram showing an example of a sheet.

FIG. 3B shows a scanned image SI which is represented by multiple pixels (not shown) that are disposed in a grid pattern running in a direction Df' corresponding to the conveyance direction Df and a direction Dw' corresponding to the specific width direction Dw. Each pixel has color values which represent gradation values of respective color components defined in a prescribed color space. For example, the color values of each pixel represent gradation values of red R, green G, and blue B. The scanned image SI contains an image portion representing the sheet SH. The image portion representing the sheet SH is called a "sheet image SHI". Though not shown in the figure, various items such as characters and symbols are depicted on the sheet image SHI. The scanned image SI also contains a region outside the sheet image SHI and representing a background BG.

The sheet image SHI has four edges, specifically, a first edge EA, a second edge EB, a third edge EC, and a fourth edge ED, shown as solid lines in the FIG. 3B. These edges EA, EB, EC, and ED represent an outline of the sheet image SHI; that is, a portion of the sheet image SHI which is in contact with the background portion BG. These four edges EA, EB, EC, and ED represent four sides SA, SB, SC, and SD of the sheet SH shown in FIG. 3A, respectively.

In the example in FIG. 3B, the third edge EC and the fourth edge ED are both partially curved. The third edge EC includes a straight line portion ECa, a straight line portion ECb, and a curved line portion ECc. The straight line portion ECa is a portion of the third edge EC, and includes an upstream end portion of the third edge EC in the conveyance direction Df. The straight line portion ECb is a portion of the third edge EC, and includes a downstream end portion of the third edge EC in the conveyance direction Df. The straight line portion ECb is slanted obliquely to the straight line portion ECa. The curved portion ECc is a portion of the third edge EC and connects the straight line portion ECa and the straight line portion ECb.

The straight line portion EDa is a portion of the fourth edge ED, and includes an upstream end portion of the fourth edge ED in the conveyance direction Df. The straight line portion EDb is a portion of the fourth edge ED, and includes a downstream end portion of the fourth edge ED in the conveyance direction Df. The straight line portion EDb is slanted obliquely to the straight line portion EDa. The curved portion EDc is a portion of the fourth edge ED that connects the straight line portion EDa and the straight line portion EDb.

Curved edges such as curved portions ECc and EDc are formed as a result of the change of the orientation of the sheet SH relative to the conveyance direction Df while the sheet SH is being conveyed. More generally, curved edges are edges with nonlinear shapes such as curved lines or polygonal lines. The orientation of the sheet SH relative to the conveyance direction Df can be identified on the basis of the angle between two sides of the sheet SH such as the third side SC and the conveyance direction Df. For example, the orientation of the sheet SH may change relative to the conveyance direction Df due to sliding of the sheet SH relative to a roller such as the driving roller 312. Sheets SH with raised, bumpy surfaces, such as credit cards, tend to slide readily relative to rollers.

In step S110 in FIG. 2, the acquisition unit 210 shown in FIG. 1 acquires the scan data from the scanner device 300. In step S120, the edge detection unit 215 analyzes the scan data to detect, from the scanned image SI shown in FIG. 3B, the edges representing the respective sides SA to SD of the sheet SH. Any arbitrary method may be utilized as the edge detection method. For example, the following method may be used as the edge detection method. First, the edge detection unit 215 executes binarization to divide the scanned image SI into a background area representing colors of the background BG and a non-background area expressing other colors. For example, colors of the background BG may be colors within a prescribed white color range. Then, the edge detection unit 215 detects, as pixels representing one or another of the edges, pixels representing the outline of the non-background area (or pixels that are in contact with the background area). Hereinafter, pixels representing one or another of the edges will be called "edge pixels". Linearly shaped portions that are formed by connecting multiple detected edge pixels correspond to edges. In this way, the edge detection unit 215 detects the four edges EA to ED that represent the four lines SA to SD. Note that other methods may be utilized as edge detection methods. For example, edge detection using an edge filter such as a Sobel filter may be utilized.

In step S130 in FIG. 2, the edge detection unit 215 determines line segments that approximate the edges. In step S200 shown in FIG. 4, the edge detection unit 215 divides the scanned image SI into two areas, and executes a Hough transform on each area. This Hough transform is carried out using the detection results of step S120 in FIG. 2; that is, using the two-level pixel values indicating whether image pixels are edge pixels. In the example in FIG. 3B, the scanned image SI is divided into two equal areas A1 and A2 by a dividing line DL extending in a direction parallel to the direction Dw'. The area A2 is located downstream from the area A1 in the direction Df.

FIGS. 5A and 5B show graphs which each show a horizontal axis indicating an angle Ag, and a vertical axis indicating a distance Dg. A point identified by a single combination of an angle Ag and a distance Dg represents a single straight line on the scanned image SI. The angle Ag represents an angle between a reference direction (not shown) on the scanned image SI and the straight line. The distance Dg represents a distance between a reference point (not shown) on the scanned image SI and the straight line.

The edge detection unit 215 executes a Hough transform to calculate, for each combination of the angle Ag and the distance Dg, the total number of edge pixels that overlaps the straight line specified by the combination of the angle Ag and the distance Dg. Hereinafter, the total number of edge pixels that overlap with a specified straight line will be referred to as the "edge pixel count". When the edge pixel count for a particular combination of angle Ag and distance Dg is large, the straight line specified by the particular combination of angle Ag and distance Dg is presumed to indicate an edge that is represented by a large number of edge pixels. For example, in step S200 in FIG. 4, the edge detection unit 215 divides the respective ranges of angles Ag and distances Dg into multiple partial ranges, and calculates the edge pixel count for each cell. A cell is defined by combination of a partial range of angles Ag and a partial range of distances Dg. The central value of a partial range of angles Ag is used as the representative angle Ag of the cell. Likewise, the central value of a partial range of distances Dg is used as the representative distance Dg of the cell.

In the graphs in FIGS. 5A and 5B, combinations of an angle Ag and a distance Dg for which the edge pixel count is large are shown as points. FIG. 5A shows a first point P1 representing the first edge EA (FIG. 3B), a second point P2 representing the straight line portion EDa (FIG. 3B), and a third point P3 representing the straight line portion ECa (FIG. 3B). FIG. 5B shows a fourth point P4 representing the second edge EB (FIG. 3B), a fifth point P5 representing the straight line portion EDb, and a sixth point P6 representing the straight line portion ECb.

As described with reference to FIG. 3A, the two sides SC and SD are perpendicular to the first side SA. Consequently, the two straight line portions ECa and EDa in FIG. 3B are perpendicular to the first edge EA. As a result, in the graph in FIG. 5A, difference in the angle Ag between the point P2 representing the straight line portion EDa (or the point P3 representing the straight line portion ECa) and the point P1 representing the first edge EA is 90 degrees. Likewise, in the graph in FIG. 5B, difference in the angle Ag between the point P5 representing the straight line portion EDb (or the point P6 representing the straight line portion ECb) and the point P4 representing the second edge EB is 90 degrees.

Figure 4:
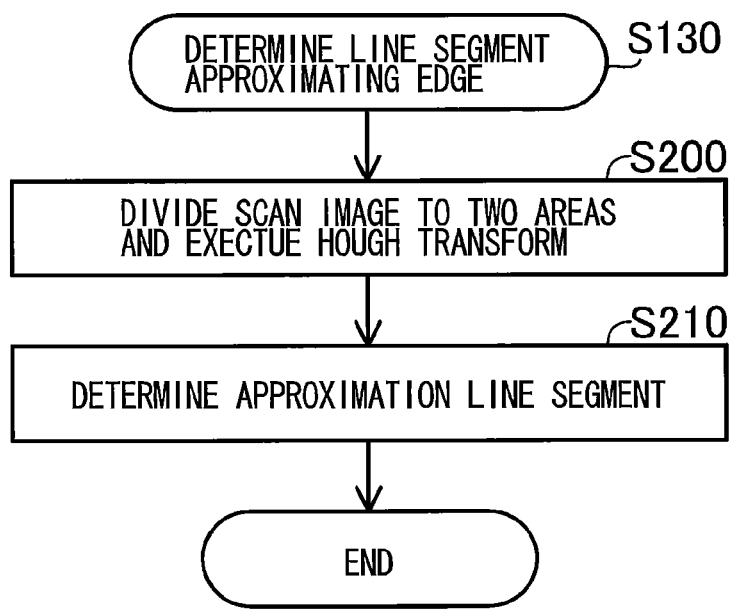
FIG. 4 is a flowchart illustrating steps in a process for determining approximation line segment according to the first embodiment.

In step S210 in FIG. 4, the edge detection unit 215 determines approximation line segments using the results of the Hough transform. For example, the edge detection unit 215 determines, as a straight line approximating an edge, a straight line that is specified by the combination of the representative angle Ag and the representative distance Dg of a cell meeting two conditions: (1) the edge pixel count for the cell is greater than or equal to a prescribed threshold; and (2) the edge pixel count for the cell is a maximum, that is, the edge pixel count for the cell indicates a local peak.

In order to increase the precision of the approximation, the edge detection unit 215 searches for a straight line representing the first edge EA from within a first area AsA shown in FIG. 5A. The first area AsA is determined on the basis of a combination of an angle Ag and a distance Dg so as to cover a predetermined range. The point P1 indicating the combination is arranged at the center of the predetermined range. Specifically, the first area AsA indicates a range in which points indicative of possible combinations of angles Ag and distances Dg are included. The possible combinations of angles Ag and distances Dg correspond to variable positions of the sheet SH that can be disposed on the conveyance path FP of the conveyance mechanism 330 (FIG. 1). The variable positions are combinations of variable locations and variable orientations of the sheet SH. The edge detection unit 215 then searches for straight lines representing the straight line portions ECa and EDa, using an angle Ag resulting from adding 90 degrees to the angle Ag of the straight line representing the first edge EA.

Likewise, the edge detection unit 215 searches for a straight line representing the second edge EB from within a second area AsB shown in FIG. 5B. The edge detection unit 215 then searches for straight lines representing the straight line portions ECb and EDb, using an angle Ag resulting from adding 90 degrees to the angle Ag of the straight line representing the second edge EB.

Figure 6:
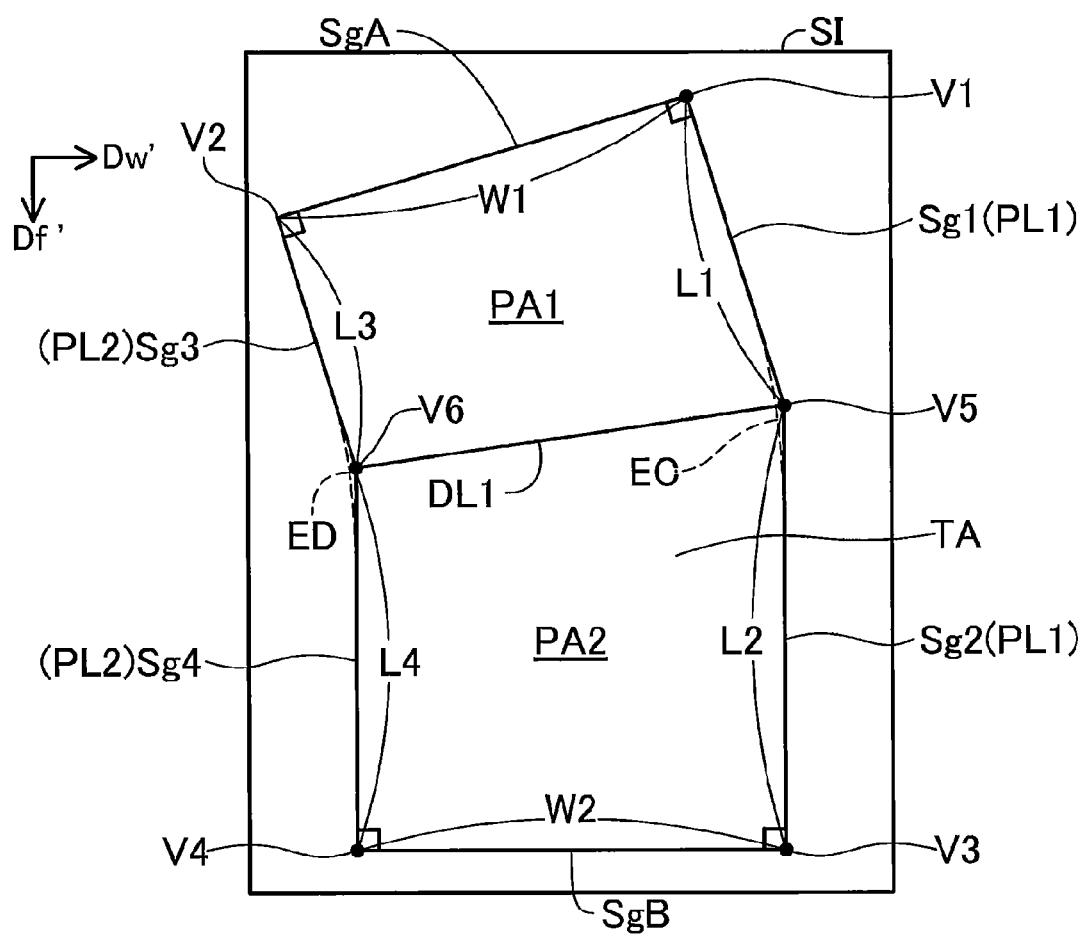
FIG. 6 is an explanatory diagram showing an example of approximation line segments.

In FIG. 6, the approximation line segments are superimposed on the scanned image SI. Six line segments SgA, Sg3, Sg1, SgB, Sg4, and Sg2, which correspond to the points P1 to P6 described with reference to FIGS. 5A and 5B are shown in FIG. 6. The relationship between these six line segments and the edges shown in FIG. 3B is as follows.

First reference line segment SgA: First edge EA
Second reference line segment SgB: Second edge EB
First line segment Sg1: Straight line portion ECa of third edge EC
Second line segment Sg2: Straight line portion ECb of third edge EC
Third line segment Sg3: Straight line portion EDa of fourth edge ED
Fourth line segment Sg4: Straight line portion EDb of fourth edge ED Specifically, first, the edge detection unit 215 identifies six straight lines each containing the corresponding one of six line segments SgA, SgB, and Sg1 to Sg4, on the basis of the results of the Hough transform. And then, the edge detection unit 215 identifies the six line segments SgA, SgB, and Sg1 to Sg4 by calculating six intersection points (vertices V1-V6) obtained on the basis of the intersection of the six straight lines that identified by the edge detection unit 215.

A polygonal line PL1 is comprised of the first line segment Sg1 and the second line segment Sg2 and approximates the third edge EC. The first line segment Sg1 extends, perpendicularly to the first reference line segment SgA, from the vertex V1 toward the second reference line segment SgB. The vertex V1 is located at the downstream end of the first reference line segment SgA in the direction Dw'. The second line segment Sg2 extends, perpendicularly to the second reference line segment SgB, from the vertex V3 toward the first reference line segment SgA. The vertex V3 is located at the downstream end of the second reference line segment SgB in the direction Dw'. The second line segment Sg2 connects with the first line segment Sg1 at the vertex V5.

A polygonal line PL2 is comprised of the third line segment Sg3 and the fourth line segment Sg4 and approximates the fourth edge ED. The third line segment Sg3 extends, perpendicularly to the first reference line segment SgA, from the vertex V2 toward the second reference line segment SgB. The vertex V2 is located at the upstream end of the first reference line segment SgA in the direction Dw'. The fourth line segment Sg4 extends, perpendicularly to the second reference line segment SgB, from the vertex V4 toward the first reference line segment SgA. The vertex V4 is located at the upstream end of the second reference line segment SgB in the direction Dw'. The fourth line segment Sg4 connects with the third line segment Sg3 at the vertex V6.

Shown in FIG. 6 are a first reference length W1, a first length L1, and a second length L2. The first reference length W1 is the length of the first reference line segment SgA. The first length L1 is the length of the first line segment Sg1. The second length L2 is the length of the second line segment Sg2. Also shown in FIG. 6 are a second reference length W2, a third length L3, and a fourth length L4. The second reference length W2 is the length of the second reference line segment SgB. The third length L3 is the length of the third line segment Sg3. The fourth length L4 is the length of the fourth line segment Sg4.

In step S140 in FIG. 2, the determining unit 220 determines whether the scanned image SI includes nonlinearly-shaped edges corresponding to the sides of the sheet SH. In other words, the determining unit 220 determines whether a plurality of edge lines corresponding to the sides of the sheet include at least one non-linear edge lines. In the first embodiment, the determining unit 220 determines that the scanned image SI includes non-linear edge lines when the inclination angle of the second reference line segment SgB relative to the first reference line segment SgA (FIG. 6) is larger than a predetermined threshold. When the inclination angle of the second reference line segment SgB relative to the first reference line segment SgA is larger than the predetermined threshold, the inclination angle of the second edge EB relative to the first edge EA is also larger than the threshold. When the inclination angle of the second edge EB relative to the first edge EA is larger than the threshold, there is a high probability that the third edge EC and the fourth edge ED are curved and that the scanned image SI is deemed to include nonlinearly-shaped edges. Hereinafter, the predetermined threshold is referred to as the first angle threshold. In other words, the first angle threshold is an angle to be compared to the inclination angle of the second reference line segment SgB relative to the first reference line segment SgA.

The inclination angle of the second reference line segment SgB relative to the first reference line segment SgA is the smaller of two angles resulting from intersecting a line parallel to the first reference line segment SgA with a line parallel to the second reference line segment SgB. When the second reference line segment SgB is parallel to the first reference line segment SgA, the inclination angle is zero degrees. For the first angle threshold, zero (meaning parallel) or a value larger than zero may be employed.

When the determining unit 220 determines that the scanned image SI does not include nonlinearly-shaped edges (S140: No), the sheet image is determined to be rectangular in contrast to the sheet image SHI in FIG. 3B. In this case, in step S160, the tilt correction unit 240 determines whether the sheet image in the scanned image SI is tilted or skewed.

For example, when the inclination angle of the first reference line segment SgA—that is, the first edge EA—relative to the direction Dw' is larger than the first angle threshold, the sheet image is deemed to be tilted. When the sheet image is deemed to not be tilted, the tilt correction unit 240 stores the scan data as is in a memory device such as the nonvolatile storage device 130 as final image data, and then the scan processing of FIG. 2 ends. When the sheet image is deemed to be tilted, the tilt correction unit 240 generates post-correction image data by correcting the scan data so that the tilting of the edges in the scanned image SI is adjusted. Hereinafter, the image data acquired by correction of the tilt in the scan data is referred to as the second image data. Specifically, the tilt correction unit 240 carries out correction by rotating the sheet image so that the first reference line segment SgA extends in a direction parallel to the direction Dw'. As a result, the second image data represents a sheet image which is not tilted. Then, the tilt correction unit 240 stores the second image data generated as a result of this correction in a memory device such as the nonvolatile storage device 130, and the scan processing of FIG. 2 ends.

When the determining unit 220 determines that the scanned image SI includes nonlinearly-shaped edges (S140: Yes), in step S150 the image correction unit 230 executes processing to transform the sheet image SHI. Specifically, the image correction unit 230 generates post-correction image data by correcting the scan data so that the nonlinearly-shaped edges are adjusted to become linearly shaped edges. Hereinafter, the image data acquired by the adjustment of the nonlinearly-shaped edges to linearly-shaped edges is referred to as the first image data.

Figure 7:
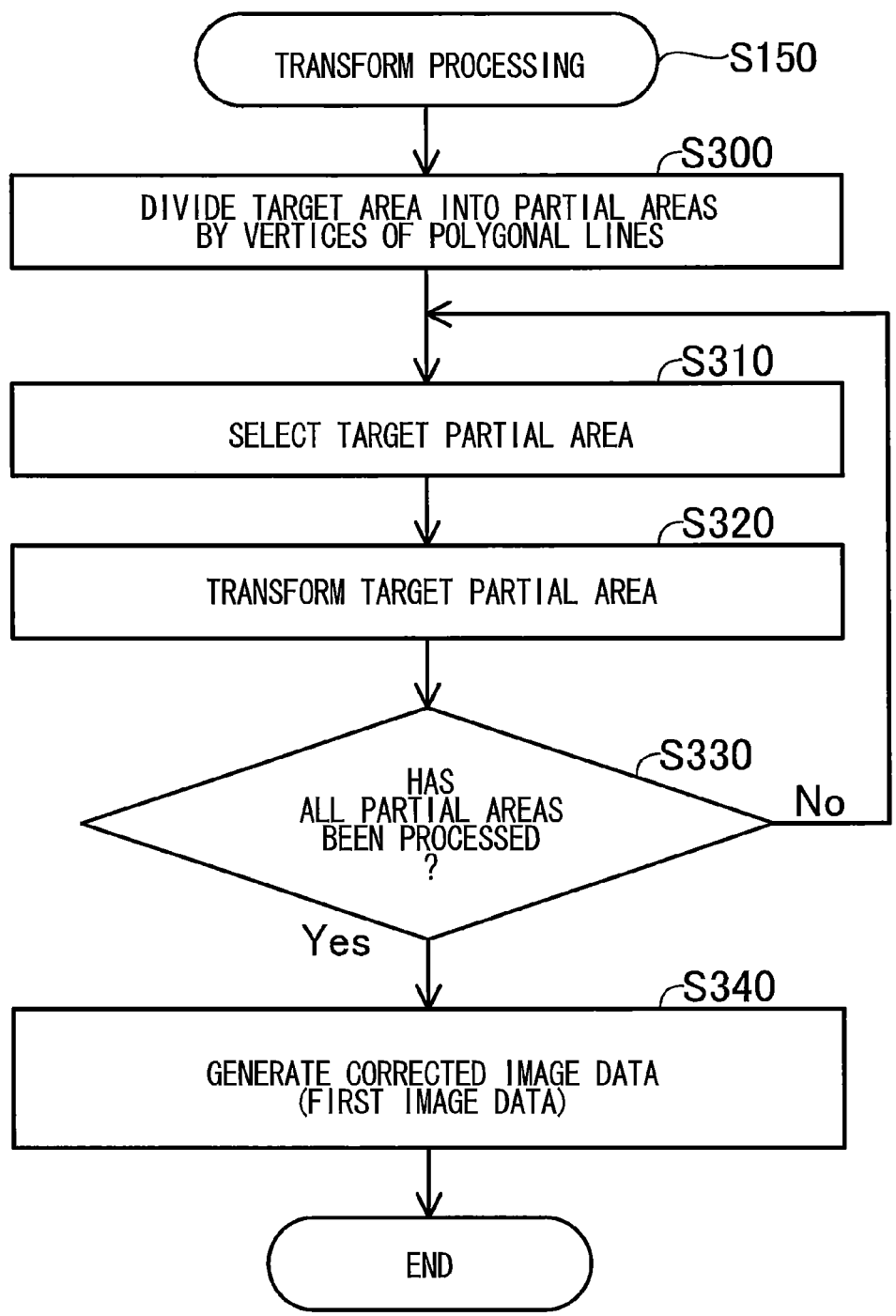
FIG. 7 is a flowchart illustrating steps in a transform processing.

FIG. 7 is a flowchart showing steps in a transform processing. In step S300, the image correction unit 230 identifies an area to target for transformation processing, and divides the target area into partial areas. In the first embodiment, the target area is an area TA enclosed by: the linearly shaped first edge EA representing the first side SA of the sheet SH shown in FIG. 3A (that is, the first reference line segment SgA shown in FIG. 6); the linearly shaped second edge EB representing the second side SB (that is, the first reference line segment SgA); the first polygonal line PL1 which approximates the third side SC; and the second polygonal line PL2 which approximates the fourth side SD. This area TA is called the target area TA, and is shown in FIG. 6. The target area TA may contain a portion of the background BG shown in FIG. 3B. For example, the target area TA may contain a portion of the background BG which is in the vicinity of the vertex V5 in FIG. 6. Moreover, a portion of the sheet image SHI may be excluded from the target area TA. For example, a portion of the sheet image SHI in the vicinity of the vertex V6 in FIG. 6 may be excluded from the target area TA.

As shown in FIG. 6, the image correction unit 230 divides the target area TA into two partial areas PA1 and PA2 using a straight line DL1 that passes through the vertex V5 and the vertex V6. The vertex V5 is a vertex disposed on the polygonal line PL1 and other than the vertices (end points) 1 and 3. The vertex V6 is a vertex disposed on the polygonal line PL2 and other than the vertices (end points) 2 and 4.

In step S310 of FIG. 7, the image correction unit 230 selects from among the partial areas a partial area which has not yet been processed. As will be explained in detail below, in step S320 the image correction unit 230 generates post-transformation image data by transforming the target area represented by the scan data. In step S330, the image correction unit 230 determines whether all partial area has been processed, and repeats steps S310 and S320 until all partial area has been processed. When all partial area has been processed, in step S340 the image correction unit 230 generates the first image data by composing all post-transformation image data representing all post-transformation target areas. The image correction unit 230 then stores the first image data (post-correction image data) in a memory device such as the nonvolatile storage device 130, and the transforming processing in FIG. 7 ends.

Figure 8:
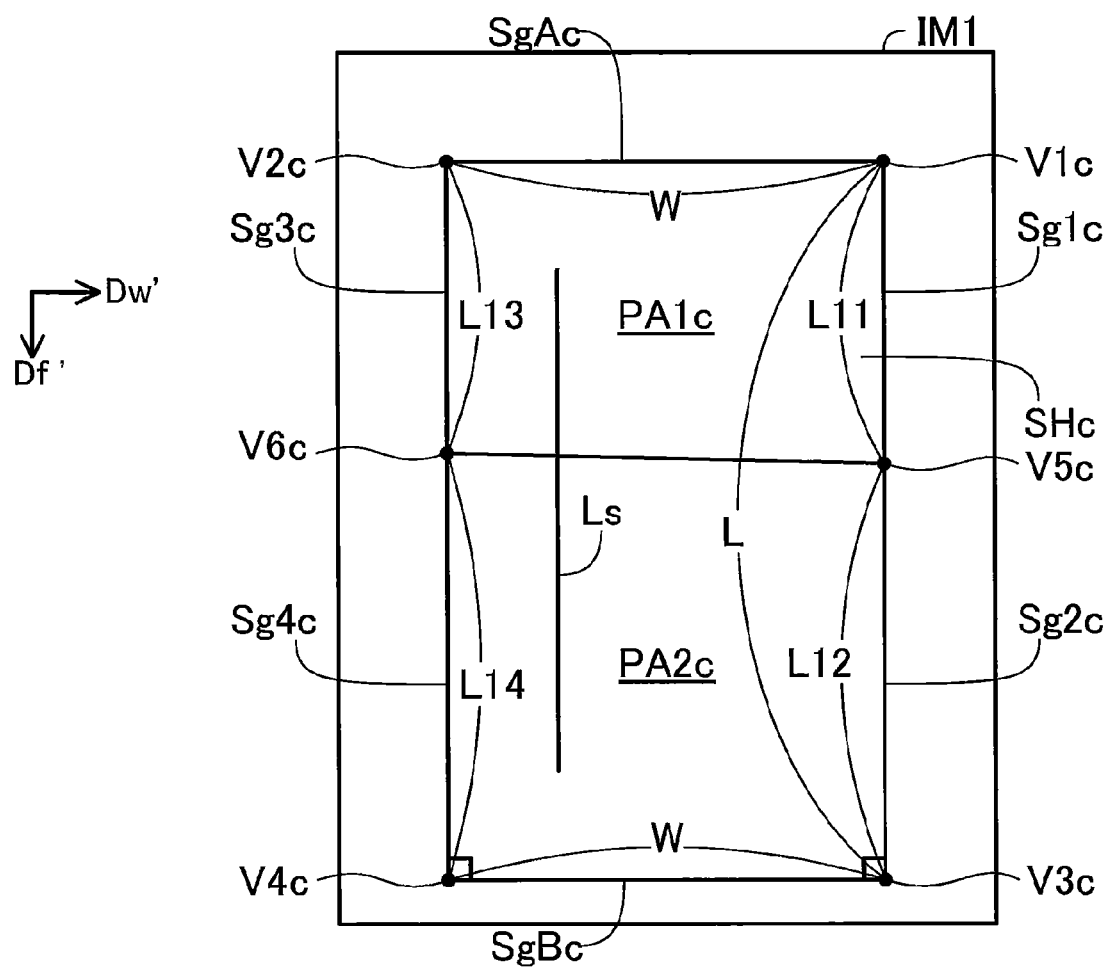
FIG. 8 is an explanatory diagram showing an example of an image that have been corrected.

As shown in FIG. 8, this post-correction image IM1 contains a post-correction sheet image SHc. The post-correction sheet image SHc has an outline which is rectangular-shaped. The image correction unit 230 corrects the scan data so that the nonlinearly-shaped edges such as the third edge EC shown in FIG. 3B are adjusted to become linearly shaped, and generates the post-correction image data (the first image data) representing the post-correction image IM1. In other words, the scan data is corrected by: changing a pair of the linear edge lines EA and EB to a pair of linear edge lines parallel to each other by aligning the edge line EA with the edge line EB; and changing a pair of non-linear edge lines EC and ED to a pair of linear edge lines.

FIG. 8 shows line segments and vertices obtained by correcting the line segments and vertices shown in FIG. 6. Here, reference characters for post-correction elements are constructed by appending "c" to the reference characters of corresponding pre-correction elements. For example, the vertices V1c to V6c respectively represent the pre-correction vertices V1 to V6 shown in FIG. 6 after having been moved as a result of transformation processing. Likewise, the line segments SgAc, SgBc, Sg1c, Sg2c, Sg3c, and Sg4c in FIG. 8 respectively represent the pre-correction vertices SgA, SgB, Sg1, Sg2, Sg3, and Sg4 having been moved as a result of transformation processing.

In step S320 in FIG. 7, the image correction unit 230 transforms target partial area by moving the vertices forming the target partial area shown in FIG. 6 in the following manner. The vectors V1 and V2 at the ends of the first reference line segment SgA shown in FIG. 6, and the vectors V3 and V4 at the ends of the second reference line segment SgB shown in FIG. 6, are moved so as to form a rectangle. The post-move vertices are shown as vertices V1c to V4c in FIG. 8. As shown in FIG. 8, the line segment SgAc connects the post-move vertices V1c and V2c, and the line segment SgBc connects the post-move vertices V3c and V4c. The line segments SgAc and SgBc are parallel to the specific width direction Dw. Each of the line segments SgAc and SgBc has a length W which is the average of the length W1 of the first reference line segment SgA and the length W2 of the second reference line segment SgB. The distance L between the line segments SgAc and SgBc is the average of a length (L1+L2) of the first polygonal line PL1 shown in FIG. 6, and a length (L3+L4) of the second polygonal line PL2 shown in FIG. 6.

The vertex V5 is disposed at an intermediate position on the first polygonal line PL1 shown in FIG. 6 and is moved onto a line connecting the post-correction vertices V1c and V3c. The vertices V1c and V3c respectively correspond to the vertices V1 and V3 on the first polygonal line PL1. The vertex resulting from having moved the vertex V5 is shown in FIG. 8 as the vertex V5c. Shown in FIG. 8 are a first length L11 and a second length L12. The first length L11 is the length of the post-correction first line segment Sg1c. The second length L12 is the length of the post-correction second line segment Sg2c. Here, a ratio (L11:L12) of the distance between the post-correction vertices V1c and V5c to the distance between post-correction vertices V5c and V3c is the same as a ratio (L1:L2) of the distance between the pre-correction vertices V1 and V5 to the distance between pre-correction vertices V5 and V3.

Likewise, the vertex V6 is disposed at an intermediate position on the second polygonal line PL2 shown in FIG. 6 and is moved onto a line connecting the post-correction vertices V2c and V4c. The post-correction vertices V2c and V4c correspond to the end vertices V2 and V4 on the second polygonal line PL2, respectively. The vertex resulting from having moved the vertex V6 is shown in FIG. 8 as the vertex V6c. Shown in FIG. 8 are a third length L13 and a fourth length L14. The third length L13 is the length of the post-correction first line segment Sg3c. The fourth length L14 is the length of the post-correction second line segment Sg4c. Here, a ratio (L13:L14) of the distance between the post-correction vertices V2c and V6c to the distance between post-correction vertices V6c and V4c is the same as a ratio (L3:L4) of the distance between the pre-correction vertices V2 and V6 to the distance between pre-correction vertices V6 and V4.

Figure 9:
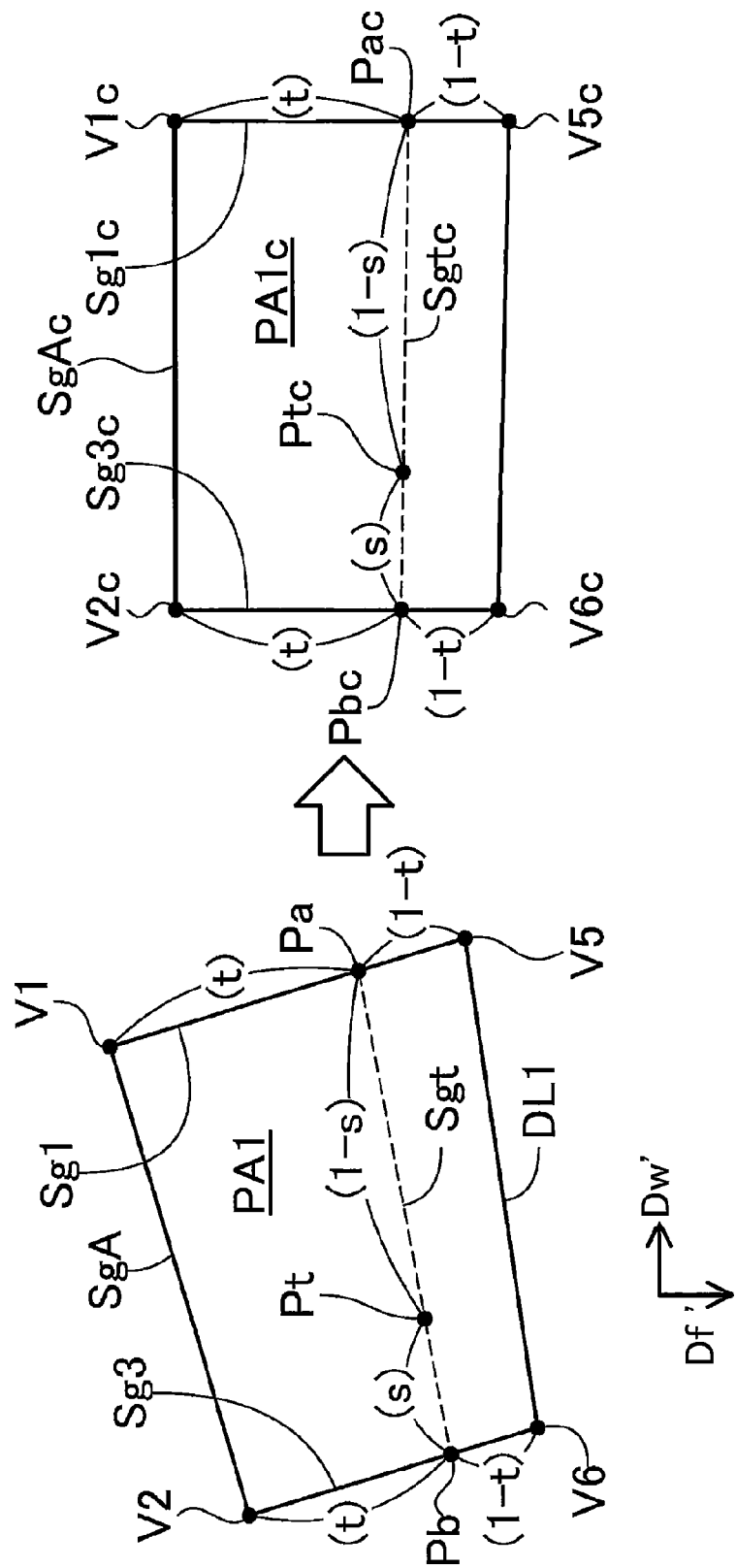
FIG. 9 is an explanatory diagram showing how to execute the transform processing on a first partial area.

In step S320 in FIG. 7, the image correction unit 230 determines color values for each pixel included in the post-correction target area using the post-correction vertices. FIG. 9 is a schematic diagram showing an example of transformation processing performed on the first partial area PA1. The pre-processing first partial area PA1 is shown on the left side of FIG. 9, and the post-processing first partial area PA1c is shown on the right side of FIG. 9.

The image correction unit 230 determines the color values of a target pixel Ptc at any arbitrary location in the post-processing first partial area PA1c in the following manner.

First, the image correction unit 230 identifies a target line segment Sgtc using a first variable t which is between 0 and 1, inclusive. The target line segment Sgtc is a line segment which connects a first point Pac and a second point Pbc. The first point Pac is disposed on the post-correction first line segment Sg1c corresponding to the line segment Sg1 of the first polygonal line PL1 shown in FIG. 6. The second point Pbc is disposed on the post-correction third line segment Sg3c corresponding to the line segment Sg3 of the second polygonal line PL2 shown in FIG. 6. The first point Pac divides the first line segment Sg1c from the vertex V1c to the vertex V5c at a ratio of t:(1−t). The second point Pbc divides the third line segment Sg3c from the vertex V2c to the vertex V6c at a ratio of t:(1−t). The image correction unit 230 calculates a value for the first variable "t" that represents the target line segment Sgtc passing with the target pixel Ptc. Next, the image correction unit 230 calculates a value for a second variable "s" that represents a position of the target pixel Ptc on the target line segment Sgtc. The target pixel Ptc is a located at a position that divides the target line segment Sgtc from the second point Pbc to the first point Pac at a ratio of s:(1−s).

Next, the image correction unit 230 uses the first variable "t" and the second variable "s" to identify a reference pixel Pt. The reference pixel Pt is included in the pre-correction first partial area PA1 and corresponds to the target pixel Ptc in the post-correction first partial area PA1c. The image correction unit 230 also uses the first variable "t" to identify a reference line segment Sgt on the pre-correction first partial area PA1. The reference line segment Sgt is a line segment which connects a first point Pa and a second point Pb. As shown in FIG. 9, the first point Pa is disposed on the pre-correction first line segment Sg1, and the second point Pb is disposed on the pre-correction third line segment Sg3. The first point Pa divides the first line segment Sg1 from the vertex V1 to the vertex V5 at a ratio of t:(1−t). The second point Pb divides the third line segment Sg3 from the vertex V2 to the vertex V6 at a ratio of t:(1−t). Next, the image correction unit 230 uses the second variable "s" to identify a position of the reference pixel Pt on the reference line segment Sgt. The reference pixel Pt is a located at a position that divides the reference line segment Sgt from the second point Pb to the first point Pa at a ratio of s:(1−s).

The image correction unit 230 employs, as the color values of the target pixel Ptc, the color values of the reference pixel Pt identified in the above manner. In other words, the color values represented by the scan data are determined as the color values of the target pixel Ptc. The image correction unit 230 then determines, according to the same method as above, the color values of all individual pixels in the post-correction first partial area PA1c. In this way, the image correction unit 230 completes transformation processing on the first partial area PA1

The image correction unit 230 executes transformation processing on other partial areas such as a second partial area PA2c in the same manner. The post-correction sheet image SHc is comprised of multiple post-transformation partial areas obtained by transforming the respective partial areas represented by the approximation line segments shown in FIG. 6.

In this way, the image correction unit 230 generates the post-correction image IM1 (the first image data) representing the post-correction sheet image SHc that results from changing, to a rectangular shape, the curved sheet image SHl in the scanned image SI shown in FIG. 3B. The interior of the post-correction sheet image SHc is corrected in conjunction with the correction of the shape of the outline of the post-correction sheet image SHc. As a result, the post-correction image IM1 is able to adequately represent the sheet SH. For example, when the sheet SH shown in FIG. 3A includes a straight line Ls extending in the conveyance direction Df, a portion of the straight line Ls might be represented as being curved in the scanned image SI shown in FIG. 3B. However, with the image processing apparatus, the straight line Ls can be represented as a straight line in the post-correction image IM1 shown in FIG. 8. In areas outside of the post-correction sheet image SHc in the post-correction image IM1, color values are set to color values representing the background BG. Color values representing the background BG may be color values representing a prescribed white color, for example.

In this way, in the first embodiment, when the scanned image SI is determined to include nonlinearly-shaped edges corresponding to sides of the sheet SH (S140: Yes in FIG. 2), the image correction unit 230 generates post-correction image data representing the post-correction image IM1 by correcting the scan data so that the nonlinearly-shaped edges are adjusted to become linearly shaped edges. As a result, it is possible to obtain post-correction image data representing such an image that a non-linear shape of edge line representing a side of the sheet SH is adjusted into a linear shape.

In step S140 in FIG. 2, when the inclination angle of the linearly shaped second edge EB relative to the first edge EA (an angle of the second reference line segment SgB relative to the first reference line segment SgA shown in FIG. 6) is larger than the first angle threshold, the determining unit 220 determines that the scanned image SI contains nonlinearly-shaped edges. The linearly shaped first edge EA represents the first side SA located at the upstream portion of the sheet SH in the conveyance direction Df shown in FIG. 3A. The linearly shaped second edge EB represents the second side SB located at the downstream position in the conveyance direction Df. In this way, the determining unit 220 can use the inclination angle to easily make this determination. Accordingly, the image correction unit 230 can generate image data that adequately represents the sheet SH.

In step S300 in FIG. 7, the image correction unit 230 divides, into two partial areas PA1 and PA2, the target area TA representing at least part of the sheet SH in the scanned image SI shown in FIG. 6. Then, in steps S320 to S330, the image correction unit 230 corrects the two partial areas PA1 and PA2 to the partial areas PA1c and PA2c, respectively. As a result, in comparison to performing correction without dividing the scanned image SI, the image correction unit 230 can easily improve correction precision and generate data that adequately represents the sheet SH.

In step S130 in FIG. 2 (or more specifically, step S210 in FIG. 4), the edge detection unit 215 determines the first polygonal line PL1 and the second polygonal line PL2. The first polygonal line PL1 is comprised of the two line segments Sg1 and Sg2, and approximates the edge EC representing the third side SC of the sheet SH. The second polygonal line PL2 is comprised of the two line segments Sg3 and Sg4, and approximates the edge ED representing the third side SD of the sheet SH. Then, in step S150 in FIG. 2 (or more specifically, step S300 in FIG. 7), the image correction unit 230 divides the target area TA into two partial areas PA1 and PA2 using the straight line DL1. The straight line DL1 passes the vertices V5 and V6. The vertex V5 is located on the first polygonal line PL1 and other than the vertices (end points) V1 and V3. The vertex V6 is located on the second polygonal line PL2 and other than the vertices (end points) V2 and V4. As described above, the image correction unit 230 divides the target area TA on the basis of the polygonal lines PL1 and PL2 representing the edges EC and ED, respectively. Accordingly, the image correction unit 230 can generate data that adequately represents the sheet SH.

In step S300 in FIG. 7, the image correction unit 230 employs as the target area TA the area enclosed by: the linearly shaped first edge EA (the first reference line segment SgA) representing the first side SA; the linearly shaped second edge EB (the second reference line segment SgB) representing the second side SB; the first polygonal line PL1; and the second polygonal line PL2. Here, the first polygonal line PL1 shown in FIG. 6 is comprised of the first line segment Sg1 and the second line segment Sg2. The second polygonal line PL2 is comprised of the first line segment Sg3 and the second line segment Sg4. Each of the first line segment Sg1 and the third line segment Sg3 are perpendicular to the first reference line segment SgA. Each of the second line segment Sg2 and the fourth line segment Sg4 is perpendicular to the second reference line segment SgB. Meanwhile, the first line segment Sg1 and the second line segment Sg2 are connected at the vertex V5. The third line segment Sg3 and the fourth line segment Sg4 are connected at the vertex V6. In processing shown in FIG. 7, the image correction unit 230 divides the target area TA into two partial areas PA1 and PA2 using the vertices V5 and V6 of the respective polygonal lines PL1 and PL2, and then generates the post-correction image data by correcting the scan data so that the target area is adjusted to become a rectangle. Here, the scan data is corrected by correcting each of the two partial areas PA1 and PA2 individually.

In this way, the image correction unit 230 uses the two edges EA and EB along with the four line segments Sg1 to Sg4 based on the two edges EA and EB, to generate post-correction image data that adequately represents the sheet SH.

When the scanned image SI is determined not to include any non-linear edge lines (S140: No in FIG. 2), in step S160 the tilt correction unit 240 generates the image data representing the post-correction image by correcting the scan data so that the tilt of the edges EA to ED in the scanned image SI is adjusted. In this way, the tilt correction unit 240 generates the image data that represents a sheet SH for which tilting has been corrected.

Note that for the first angle threshold utilized in step S140 in FIG. 2, a variable that varies in accordance with scan processing conditions may be employed instead of the predetermined value. For example, the first angle threshold may vary depending on size of the sheet SH. Specifically, the determining unit 220 may employ, as the first angle threshold' a value that becomes progressively smaller for progressively larger values of the length W1 of the first reference line segment SgA shown in FIG. 6. In either case, in order to improve the precision of the assessment, it is preferable for the first angle threshold to be small; for example, values from zero to five degrees inclusive are preferable, values from zero to three degrees inclusive are even more preferable, and values from zero to one degree inclusive are most preferable.

B. Second Embodiment

Figure 10:
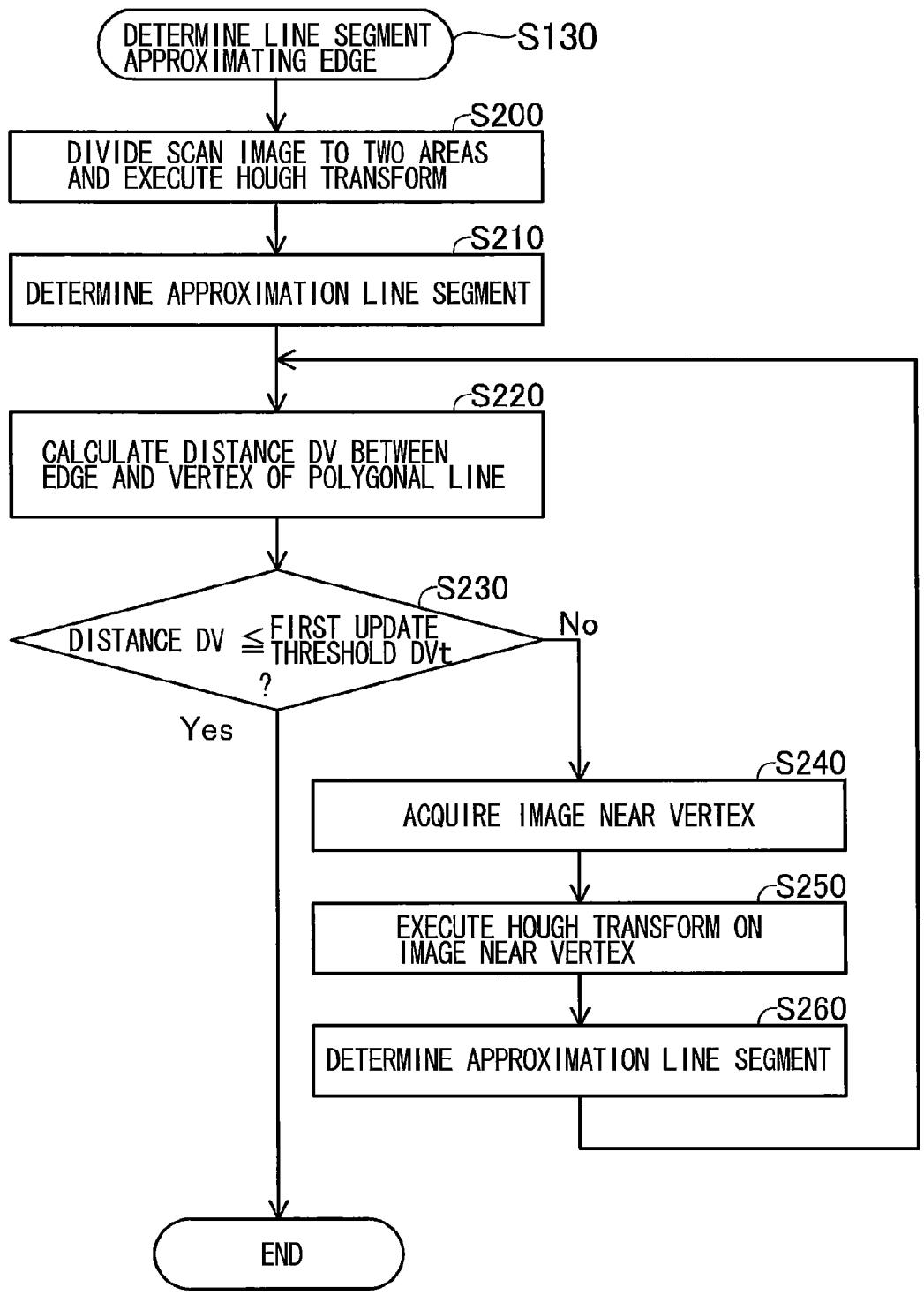
FIG. 10 is a flowchart illustrating steps in a process for determining approximation line segment according to a second embodiment.

FIG. 10 is a flowchart illustrating steps in a process for determining approximation line segments in a second embodiment. This processing is executed by step S130 in FIG. 2. The processing of FIG. 10 differs from that of FIG. 4 in the first embodiment in that, when a distance between a polygonal line and an edge is large, a line segment is added to the polygonal line. In the second embodiment, the processing in FIGS. 2 and 7 is executed in the same way as for the first embodiment. The same configuration as the scanning system 1000 shown in FIG. 1 is utilized as a scanning system according to the second embodiment.

Steps S200 and S210 are respectively the same as steps S200 and S210 in FIG. 4. In step S220, the edge detection unit 215 calculates a distance DV between each polygonal line and an edge corresponding to the polygonal line.

Figure 11:
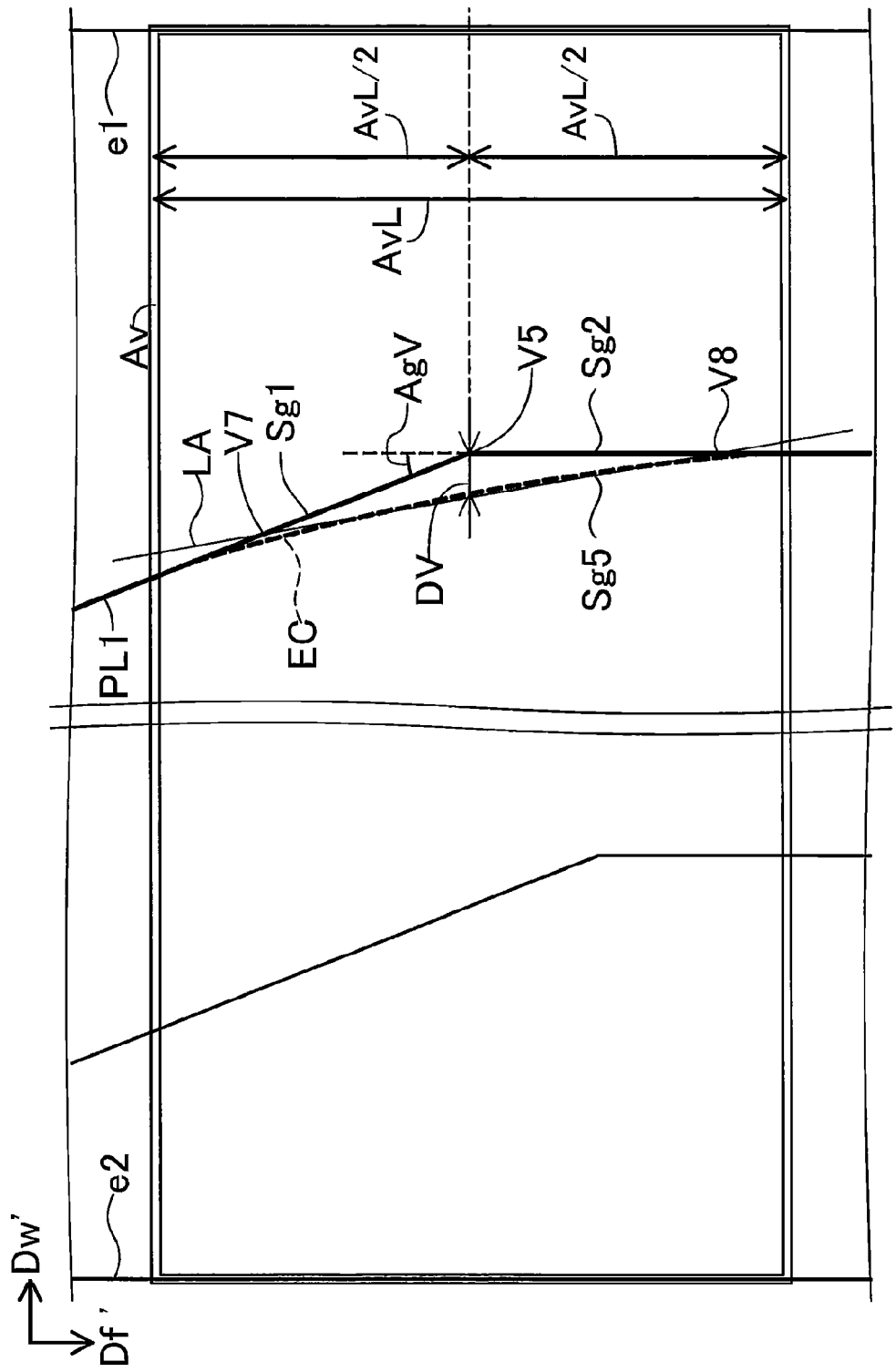
FIG. 11 is an explanatory diagram showing how to determine a distance between an edge and a vertex of a polygonal line.

FIG. 11 shows an enlarged view of a portion of the scanned image SI shown in FIG. 3B which includes the vertex V5. In the figure, the third edge EC and the polygonal line PL1 that approximates the third edge EC are shown with thick lines. The edge detection unit 215 calculates, as the distance DV, a distance between the third edge EC and the vertex V5 of the polygonal line PL1 in the direction Dw'. The distance between the third edge EC and the vertex V5 in the direction Dw' is calculated in terms of, for example, number of pixels. This distance DV being large indicates that the precision of the approximation of the third edge EC by the first polygonal line PL1 is low.

In step S220 in FIG. 10, the edge detection unit 215 calculates the respective distances DV for all vertices on the polygonal line PL1 except the end points, and for all vertices on the polygonal line PL2 except the end points.

In step 230, the edge detection unit 215 determines whether all of the distances DV calculated in step S220 are less than or equal to a predetermined first update threshold DVt. Zero or a value larger than zero may be employed as the first update threshold DVt. The distances DV of the respective vertices all being less than or equal to the first update threshold DVt indicates that the precision of the approximation of the respective edges by the first polygonal line PL1 and the second polygonal line PL2 is satisfactory. When each of the calculated distances DV is smaller than or equal to the predetermined first update threshold DVt (S230: Yes), the edge detection unit 215 ends the processing in FIG. 10.

When at least one distance DV of the calculated distances DV is greater than the first update threshold DVt (S230: No), for each large distance DV, the edge detection unit 215 adds to the polygonal line in question a line segment approximating a portion of the edge in the vicinity of the vertex associated with the large distance DV. Specifically, in step S240, the edge detection unit 215 retrieves, from the scan data SI, a partial image of the immediate surroundings of the vertex associated with the distance DV that is larger than the first update threshold.

In FIG. 11, an example of a partial image of the immediate surroundings of the vertex V5 is shown with double lines. The partial image Av is an elongated rectangular image extending from the upstream end e1 and the downstream end e2 in the direction Dw' on the scanned image SI. A length AvL is the length of partial image Av in the direction Df. This distance AvL is expressed in terms of, for example, number of pixels. The partial area Av is disposed so that a central position on the partial area Av in the direction Df overlaps with the vertex V5. The length AvL is predetermined so that the larger the total number of line segments contained in one polygonal line prior to adding the new line segment, the smaller the value of the length AvL. For example, the edge detection unit 215 can employ, as the length AvL, a value calculated using the expression [length of the scanned image SI in the direction Df]/[total number of line segments]. The length of the scanned image SI in the direction Df is expressed in, for example, number of pixels.

In step S250 in FIG. 10, the edge detection unit 215 executes Hough transform on the partial image Av. The Hough transform method in step S250 is the same as the Hough transform method in step S200. In step S260, the edge detection unit 215 uses the results of the Hough transform to determine the approximation line segments. In the example in FIG. 11, the edge detection unit 215 determines a straight line LA that approximates a portion of the third edge EC in the partial image Av. The straight line LA intersects with the first line segment Sg1 at a point V7 at an intermediate position on the first line segment Sg1, and intersects with the second line segment Sg2 at a point V8 at an intermediate position on the second line segment Sg2. That is, the edge detection unit 215 updates the first polygonal line PL1. Hereinafter, a line segment connecting these two points (vertices) V7 and V8 will be called the fifth line segment Sg5.

Figure 12:
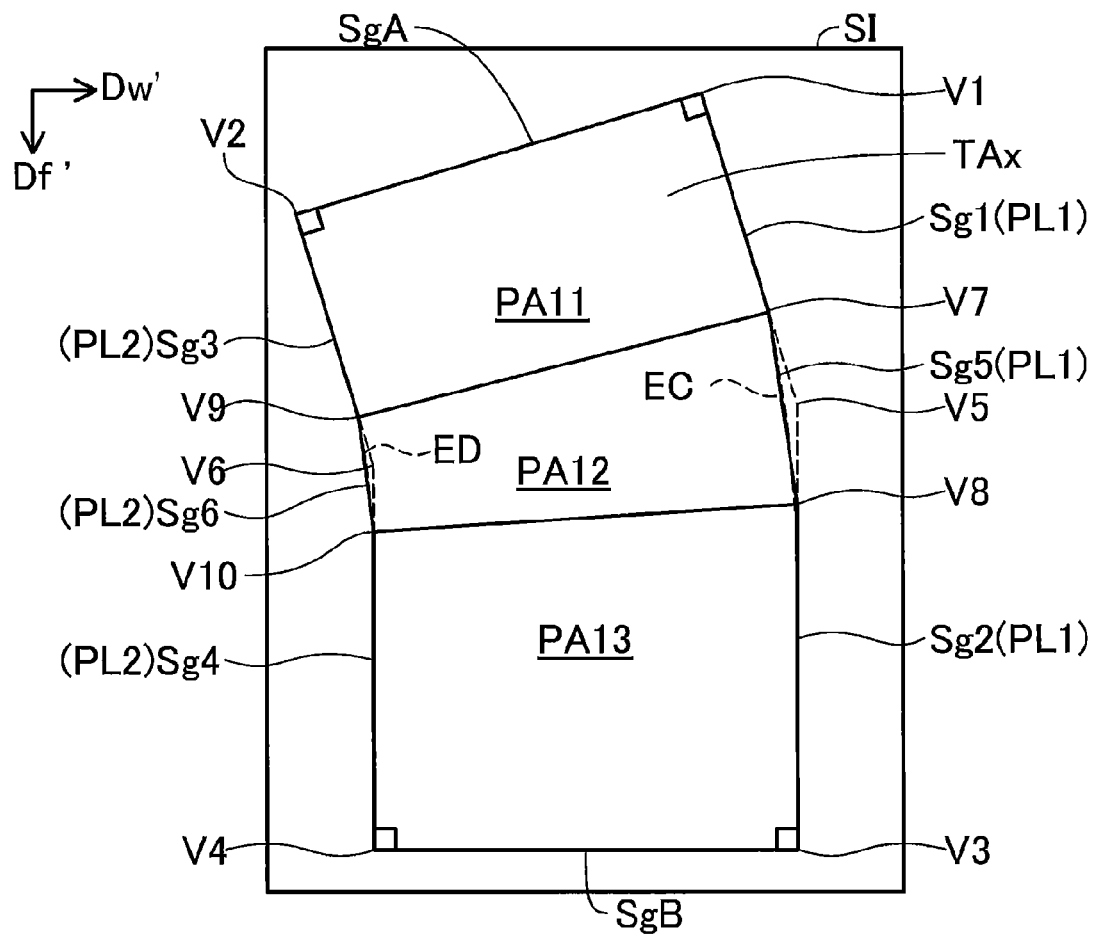
FIG. 12 is an explanatory diagram showing polygonal lines that have been updated.

FIG. 12 is a schematic diagram showing the first polygonal line PL1 after a line segment has been added; that is, the post-update first polygonal line PL1. As shown in the figure, the post-update first polygonal line PL1 is comprised of a portion between the vertex V1 and the point V7 on the first line segment Sg1, the line segment Sg5, and a portion between the point V8 and the vertex V3. As a result of the fifth line segment Sg5 being added, the vertex V5, which is associated with the large distance DV, is removed from the post-update first polygonal line PL1. The post-update first polygonal line PL1 is thereby able to more precisely approximate the third edge EC.

When the edge detection unit 215 adds a line segment to the first polygonal line PL1 for one vertex on the first polygonal line PL1, the edge detection unit 215 also adds a line segment to the second polygonal line PL2 for a vertex on the second polygonal line PL2 corresponding the one vertex on the first polygonal line PL1. Here, the vertex on the second polygonal line PL2 corresponding to the one vertex on the first polygonal line PL1 is a point defining a dividing line used to divide the target area along with the one vertex on the first polygonal line PL1. In the example in FIG. 6, the vertex V6 corresponds to the vertex V5.

As shown in FIG. 12, the edge detection unit 215 adds a sixth line segment Sg6 to the second polygonal line PL2 on the basis of the vertex V6 on the second polygonal line PL2. The post-update sixth line segment Sg6 is a line segment which connects a point V9 at an intermediate position on the third line segment Sg3, and a point V10 at an intermediate position on the third line segment Sg4. The second polygonal line PL2 is comprised of a portion between the vertex V2 and the point V9 on the third line segment Sg3, the line segment Sg6, and a portion between the point V10 and the vertex V4. As a result of the sixth line segment Sg6 being added, the vertex V6 is removed from the post-update first polygonal line PL2. The post-update first polygonal line PL2 is thereby able to more precisely approximate the fourth edge ED.

In steps S240 to S260 in FIG. 10, the edge detection unit 215 determines the sixth line segment Sg6 in the same manner as for the fifth line segment Sg5. In steps S240 to S260, the edge detection unit 215 executes processing for the first polygonal line PL1 and processing for the second polygonal line PL2, so that when a line segment is added to either the first polygonal line PL1 or the second polygonal line PL2, a line segment is added to the other polygonal line as well. When a vertex on the second polygonal line PL2 is associated with a distance DV larger than the first update threshold DVt, a line segment for that vertex on the second polygonal line PL2 is added to the second polygonal line PL2, and then a line segment for the corresponding vertex on the first polygonal line PL1 is added to the first polygonal line PL1.

For each vertex associated with a distance DV larger than the first update threshold DVt, the edge detection unit 215 adds a line segment to each of the polygonal lines PL1 and PL2 in steps S240 and S260. As a result, all vertices associated with distances DV larger than the first update threshold DVt are removed from the polygonal lines PL1 and PL2. Accordingly, the precision of the approximation by the polygonal lines PL1 and PL2 can be improved.

When step S260 has ended, the edge detection unit 215 proceeds to step S220 again. In step S220, the edge detection unit 215 calculates the respective distances DV for the vertices that were added in step S260. The edge detection unit 215 then repeats the processing in steps S240 to S260 to add line segments (or add vertices) until the respective distances DV for all of the vertices become less than or equal to the first update threshold DVt.

In addition, in step S300 in FIG. 7, the image correction unit 230 divides the target area into N partial areas (with N being an integer of 2 or greater) indicated by the post-update polygonal lines PL1 and PL2. The image correction unit 230 individually corrects each of the N partial areas by executing steps S310 to S330 on each partial area.

For example, in the example in FIG. 12, the image correction unit 230 divides a target area TAx into three partial areas PA11, PA12, and PA13, and corrects each of these partial areas PA11, PA12, and PA13. Though not shown in the figure, the intermediate vertices V7 and V8 on the first polygonal line PL1 are corrected so as to be are disposed on the straight line connecting the vertices V1c and V3c in the post-correction image shown in FIG. 8. The positions of the post-correction vertices V7c and V8c are determined so that the ratios of line segments between post-correction vertices V1c, V7c, V8c, and V3c are the same as the ratios of line segments between vertices V1, V7, V8, and V3. The same applies to intermediate vertices V9 and V10 on the second polygonal line PL2. Moreover, the same also applies when the total number of partial areas is four or greater.

According to the approximation line determination method in the second embodiment, the edge detection unit 215 determines whether the distance DV is no greater than the first update threshold Dvt in step S230 in FIG. 10. The distance DV is a distance between the vertex V5 and the third edge EC in the scanned image SI, as shown in FIG. 11. The vertex V5 connects the first line segment Sg1 and the second line segment Sg2. The third edge EC represents the downstream side of the sheet SH in the specific width direction Dw. When the distance DV is greater than the first update threshold DVt, the edge detection unit 215 adds, to the first polygonal line PL1, the fifth line segment Sg5 connecting the point V7 at an intermediate position on the first line segment Sg1 and the point V8 at an intermediate position on the second line segment Sg2 (in steps S240 to S260). Similarly, the edge detection unit 215 also adds, to the second polygonal line PL2, the sixth line segment Sg6 connecting the point V9 at an intermediate position on the third line segment Sg3 and the point V10 at an intermediate position on the fourth line segment Sg4 (in steps S240 to S260). Then, as shown in FIG. 12, the image correction unit 230 divides the target area TAx into three partial areas PA11, PA12, and PA13 using the straight line passing through the vertex V7 and the vertex V9, and the straight line passing through the vertex V8 and the vertex V10. Since a polygonal line comprised of three line segments can more adequately approximate nonlinearly-shaped edges than a polygonal line comprised of two line segments can, the image correction unit 230 is able to use suitable partial areas to generate post-correction image data.

As the first update threshold DVt, a variable that varies depending on scan processing conditions may be employed instead of a predetermined value. For example, the first update threshold DVt may vary on the basis of size of the sheet SH. Specifically, the edge detection unit 215 may employ, as the first update threshold DVt, a value that becomes progressively larger for progressively larger values of the length W1 of the first reference line segment SgA shown in FIG. 6. In either case, in order to improve the precision of the assessment, it is preferable for the first update threshold DVt to be small; for example, values greater than zero and less than or equal to 15% of the length W1 are preferable, values greater than zero and less than or equal to 10% of the length W1 are even more preferable, and values greater than zero and less than or equal to 5% of the length W1 are most preferable.

C. Third Embodiment

Figure 13:
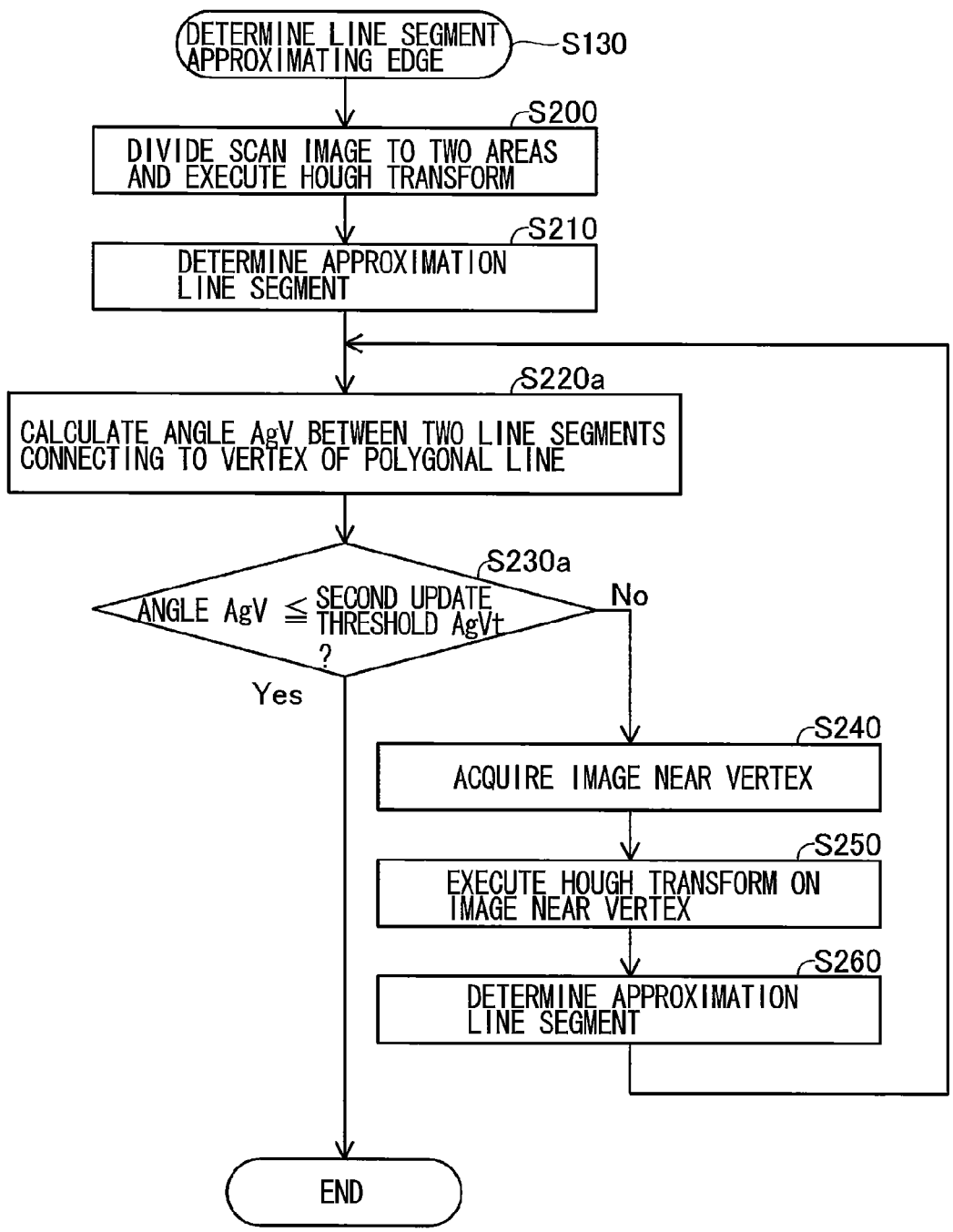
FIG. 13 is a flowchart illustrating steps in a process for determining approximation line segment according to a third embodiment.

FIG. 13 is a flowchart illustrating steps in a process for determining approximation line segments in a third embodiment. The processing of FIG. 13 is executed by step S130 in FIG. 2. The processing of FIG. 13 differs from the processing of FIG. 10 in the second embodiment only in that steps S220 and S230, which use the distances DV, have been replaced with steps S220a and S230a, which use inclination angles AgV. The structure of other parts of the flowchart is the same as the structure of FIG. 10. Hereinafter, steps in FIG. 13 that are the same as steps in FIG. 10 are assigned the same step numbers, and descriptions of these steps are omitted. In the third embodiment, the processing in FIGS. 2 and 7 is executed in the same way as for the first and second embodiments. The scanning system 1000 shown in FIG. 1 is utilized as a scanning system according to the third embodiment.

In step S220a, the edge detection unit 215 calculates the inclination angles AgV between the two lines each connecting to a vertex of the polygonal line. In FIG. 11, the inclination angle AgV associated with the vertex V5 is shown. This inclination angle AgV is the same as the smaller of angles resulting from intersecting a line parallel to the first reference line segment Sg1 with a line parallel to the second reference line segment Sg2. When the two line segments Sg1 and Sg2 are parallel, the inclination angle AgV is zero degrees. The inclination angle AgV being large indicates that the precision of the approximation of the third edge EC by the first polygonal line PL1 is low.

In step S220a in FIG. 13, the edge detection unit 215 calculates the respective inclination angles AgV of all vertices on the first polygonal line PL1 except the end vertices (end points) thereon, and all vertices on the second polygonal line PL2 except the end vertices (end points) thereon.

In step S230a, the edge detection unit 215 determines whether all of the inclination angles AgV calculated in step S220a are less than or equal to predetermined second update threshold AgVt. As the second update threshold AgVt, zero (that is, line segments being comprised of a straight line) or a value larger than zero may be employed. When all of the inclination angles AgV of the respective vertices is less than or equal to the second update threshold AgVt, the precision of the approximation of the respective edges by the first polygonal line PL1 and the second polygonal line PL2 is satisfactory. In this case (S230a: Yes), the edge detection unit 215 ends processing in FIG. 13.

When at least one inclination angle AgV is greater than the second update threshold AgVt (S230a: No), the edge detection unit 215 adds a line segment and vertices to the polygonal lines PL1 and PL2. In the third embodiment, a line segment and vertices are added on the basis of vertices that are associated with inclination angles AgV larger than the second update threshold AgVt, instead of vertices associated with distances DV larger than the first update threshold DVt that are used in the second embodiment in FIG. 10. In the above manner, the post-update polygonal lines PL1 and PL2 are determined in a similar way with in FIG. 12.

According to the method for determining the approximation line segments in the third embodiment, the edge detection unit 215 determines whether the inclination angle AgV is less than or equal to the second update threshold AgVt in step S230a in FIG. 13. In the scanned image SI shown in FIG. 11, the inclination angle AgV is an angle between a direction in which the first line segment Sg1 extends and a direction in which the second line segment Sg2 extends. When the inclination angle AgV is greater than the second update threshold AgVt, the edge detection unit 215 adds, to the first polygonal line PL1, the fifth line segment Sg5 connecting the point V7 at an intermediate position on the first line segment Sg1 and the point V8 at an intermediate position on the second line segment Sg2 (in steps S240 to S260). Further, the edge detection unit 215 also adds, to the second polygonal line PL2, the sixth line segment Sg6 connecting the point V9 at an intermediate position on the third line segment Sg3 and the point V10 at an intermediate position on the fourth line segment Sg4. Next, as shown in FIG. 12, the image correction unit 230 divides the target area TAx into three partial areas PA11, PA12, and PA13 by a straight line passing through the vertex V7 and the vertex V9 and by a straight line passing through the vertex V8 and the vertex V10. Since a polygonal line comprised of three line segments can more adequately approximate nonlinearly-shaped edges than can a polygonal line comprised of two line segments, the image correction unit 230 is able to use suitable partial areas to generate post-correction image data.

The first second threshold AgVt may be a variable that varies depending on scan processing conditions, instead of a predetermined value. For example, the second update threshold AgVt may vary according to size of sheet SH. Specifically, the edge detection unit 215 may employ, as the second update threshold AgVt, a value that becomes progressively smaller for progressively larger values of the length W1 of the first reference line segment SgA shown in FIG. 6. In either case, in order to improve the precision of the assessment, it is preferable for the second update threshold AgVt to be small; for example, values from zero to five degrees inclusive are preferable, values from zero to three degrees inclusive are even more preferable, and values from zero to one degree inclusive are most preferable.

D. Variations (1) As the determination method in step S140 in FIG. 2 (i.e., the method of determining whether the scanned image SI includes nonlinearly-shaped edges), a variety of methods can be employed other than methods that utilize the results of determining whether the inclination angle of the second edge EB relative to the first edge EA is greater than the first angle threshold. For example, it is acceptable to determine that the scanned image SI includes nonlinearly-shaped edges when a direction in which the third edge EC extends varies beyond predetermined threshold. The third edge EC represents the third side SC that is located at the downstream portion of the sheet SH in a direction (the specific width direction Dw in the embodiments) perpendicular to the conveyance direction Df. Hereinafter, the predetermined threshold with which to compare the extending direction of the third edge EC is referred to as the second angle threshold.

For example, the image correction unit 230 can determine that amount of change of directions in which the third edge EC extends is greater than the prescribed second angle threshold when the angle formed by lines approximating the third edge EC (that is, the first line segment Sg1 and the second line segment Sg2) is greater than the predetermined second angle threshold. The angle formed by the first line segment Sg1 and the second line segment Sg2 is the smaller of angles resulting from intersecting a line parallel to the first line segment Sg1 with a line parallel to the second line segment Sg2. For the second angle threshold, zero (that is, two line segments being disposed on a straight line) or a value larger than zero may be employed. Further, the second angle threshold may be a variable that varies depending on scan processing conditions, instead of a predetermined value. For example, it is acceptable for the second angle threshold to vary according to size of the sheet SH. Specifically, the determining unit 220 may employ, as the second angle threshold, an angle which becomes progressively smaller for progressively larger values of the length W1 of the first reference line segment SgA shown in FIG. 6. In either case, in order to improve the precision of the assessment, it is preferable for the second angle threshold to be small; for example, values from zero to five degrees inclusive are preferable, values from zero to three degrees inclusive are even more preferable, and values from zero to one degree inclusive are most preferable.

Methods for determining that the scanned image SI includes nonlinearly-shaped edges may also include multiple criteria. For example, the determination criteria may include first and second criteria as follows. The first criterion indicates that the inclination angle of the second edge EB relative to the first edge EA is greater than angle threshold. The second criterion indicates that an extending direction of a target edge such as the third edge EC varies beyond predetermined threshold at intermediate portion of the target edge. The target edge represents a side of the sheet SH located at the downstream portion of the sheet SH in a direction perpendicular to the conveyance direction Df (for example, in the specific width direction Dw). Here, it is acceptable to treat the determination criteria as having been satisfied when at least one from among the first criterion and the second criterion is satisfied. Alternatively, it is also acceptable to treat the determination criteria as having been satisfied when both the first criterion and the second criterion are satisfied.

(2) A variety of methods without using Hough transforms can be employed as the method of determining the approximation line segments approximating edges. For example, the edge detection unit 215 may determine line segments to approximate the positioning of multiple edges based on the least-squares method.

(3) As the method of determining new lines to be added to the polygonal lines approximating edges in the processing in FIGS. 10 and 13, a variety of methods other than methods utilizing the Hough transforms (in Steps S240 to S260) can be employed. In the example in FIG. 11, it is acceptable to add new line segments to the first polygonal line PL1 by: employing, as the vertex V7, a point disposed on the first line segment Sg1 and separated from the vertex V5 by a specific distance; employing, as the vertex V8, a point disposed on the second line segment Sg2 and separated from the vertex V5 by a specific distance; and adding to the polygonal line PL1 a line segment connecting these two vertices V7 and V8.

(4) As the method of determining whether to add new line segments to the polygonal lines approximating edges, a variety of methods can be employed other than methods using at least one of: the distance DV from the vertices of polygonal lines (FIG. 10); and the inclination angle AgV at the vertices of polygonal lines (FIG. 13). For example, the edge detection unit 215 moves a point on the first line segment Sg1 away from the vertex V1 and toward the second reference line segment SgB, while calculating the distance from that moving point to the third edge EC in the same way as the distance DV was calculated in FIG. 11. The edge detection unit 215 then identifies points for which the distance changes from being less than or equal to the first update threshold DVt to being greater than the first update threshold DVt. In other words, the edge detection unit 215 detects a position of the moving point whose distance from the edge EC exceeds the first update threshold Dvt. The edge detection unit 215 then retrieves partial images near the respective points that have been identified, and determine new line segments to be added on the basis of executing the Hough transforms on the retrieved images. The same method as in steps S240 to S260 in FIGS. 10 and 13 can be employed as the method of determining line segments using partial images near the respective points that have been identified. Note that a prescribed length can be employed as the length AvL of the respective partial images near the identified points.

(5) A variety of methods other than the methods using polygonal lines can be employed as the method of approximating edges. For example, the edge detection unit 215 may use a spline curve to determine a first curved line approximating the third edge EC (FIG. 3) and a second curved line approximating the fourth edge ED (FIG. 3). In this case, the image correction unit 230 divides the curved lines into N parts of equal length (N being an integer of 2 or greater). The image correction unit 230 then divides the target area into N partial areas using N−1 straight lines. The N−1 straight lines connect: the respective N−1 connection points of the N parts of the first curved line; and the respective N−1 respective connection points of the N parts of the second curved line. The image correction unit 230 then individually corrects each of the N partial areas. Here, the target area is enclosed by the first reference line segment SgA, a polygonal line sequential tracing a path through the N−1 connection points on the first curved line, the second reference line segment SgB, and a polygonal line sequential tracing a path through the N−1 connection points on the second curved line.

(6) A variety of methods of transforming an image can be employed instead of the methods described with reference to FIGS. 7 to 9. For example, a method of transforming the images which utilizes affine transformations may be employed. Alternatively, a method of transforming the images which utilizes so-called morphing techniques may be employed. In general, it is preferable to employ transformation processing that reduces deformation of the edges of the sheet image SHI in the scanned image SI shown in FIG. 3B and that reduces deformation of the interior portion of the sheet image SHI.

(7) Various types of processing different from the processing shown in FIGS. 2, 4, 7, 10, and 13 can be employed as scan processing. For example, it is acceptable to omit step S160 in FIG. 2. It is also acceptable to prescribe an upper limit on the number of times that the processing in steps S240 to S260 is repeated. The upper limit may be one time, or may be two times, or may be three times.

(8) Various configurations other than the configuration shown in FIG. 1 can be employed as the configuration of the reading unit 360. For example, one of the first roller pair 310 and the second roller pair 320 can be omitted. It is also acceptable to scan the sheets SH with a single photodetector that uses a rotating polygonal mirror, rather than with the sensor 340 that has multiple photodetectors 342.

(9) The functionality for processing scan data may alternatively be implemented by any type of device other than the image processing apparatus 100 shown in FIG. 1. For example, the scan data may be processed by an image processing unit (not shown) of a computer or ASIC provided with the scanner device 300, rather than by the image processing apparatus 100. In such cases, the image processing apparatus 100 can be omitted. The image processing unit may be integrated into the control unit 350.

Further, multiple devices such as computers configured to communicate with each other over a network may share the functionality for processing scan data to provide the functionality for processing scan data as a single unified entity. In this case, a system including the multiple devices corresponds to the image processing apparatus.

In the embodiments described above, part of the configuration which was implemented using hardware may be replaced by software, or conversely, part or all of the configuration which was implemented using software may be replaced by hardware. For example, the functionality of the image correction unit 230 in FIG. 1 may be implemented by special-purpose hardware circuitry having logic circuits.

Further, when all or part of the functionality of the embodiments is implemented using computer programs, these programs can be provided in a form in which the programs are stored on a non-temporary storage medium which can be read in by a computer. The programs may be used while being stored in the computer-readable storage medium. The storage medium may be either the same as or different from that the storage medium when the programs were originally provided. Here, "computer-readable storage medium" includes not only portable storage media such as memory cards and CD-ROMs, but also internal storage devices inside a computer such as ROMs, as well as external storage devices connected to the computer such as hard disk drives.

While the description has been made in detail with reference to specific embodiments thereof, it would be apparent to those skilled in the art that various changes and modifications may be made therein without departing from the spirit and scope of the above described embodiments.

What is claimed is:

1. An image processing apparatus comprising:
a processor; and
a computer readable medium encoded with a computer executable instructions performing the following steps of:
acquiring scan data from a scan data generating unit, the scan data generating unit being configured to generate the scan data by optically reading a sheet being conveyed, the scan data representing a scanned image that includes an image indicative of the sheet, the sheet having a plurality of sides;
detecting a plurality of edge lines from the scanned image by analyzing the scan data, the plurality of edge lines representing the plurality of sides, respectively;
determining whether the plurality of edge lines include a non-linear edge line; and
correcting, when the plurality of edge lines is determined to include a non-linear edge line, the scan data so that the non-linear edge line is changed to a linear edge line.

2. The image processing apparatus according to claim 1, wherein the plurality of edge lines is determined to include a non-linear edge line when a predetermined condition is met, the predetermined condition including a condition that an angle formed between a first edge line and a second edge line is greater than an angle threshold, the plurality of edge lines including the first edge line and the second edge line, the first edge line being a straight line corresponding to a first side, the second edge line being a straight line corresponding to a second side, the plurality of sides including the first side and the second side that extend in a first direction, the first direction corresponding to a direction perpendicular to a conveying direction in which the sheet is to be conveyed.

3. The image processing apparatus according to claim 2, wherein the angle threshold is a variable that varies depending on the scan data.

4. The image processing apparatus according to claim 3, wherein the angle threshold is a variable that varies depending on a size of the image indicative of the sheet.

5. The image processing apparatus according to claim 1, wherein the plurality of edge lines is determined to include a non-linear edge line when a predetermined condition is met, the predetermined condition including a condition that an angle formed between a first straight line segment and a second straight line segment is greater than an angle threshold, the plurality of edge lines including one edge line that correspond to one side of the plurality of sides, the one edge line extending in a direction corresponding to a conveying direction in which the sheet is to be conveyed, the one edge line including the first straight line segment and the second straight line segment, the first straight line segment having one end point of the one edge line, the second straight line segment having another end point of the one edge line.

6. The image processing apparatus according to claim 5, wherein the angle threshold is a variable that varies depending on the scan data.

7. The image processing apparatus according to claim 6, wherein the angle threshold is a variable that varies depending on a size of the image indicative of the sheet.

8. The image processing apparatus according to claim 1, wherein the scan data is corrected by:
   dividing a target area into N partial areas, N being an integer greater than or equal to 2, the target area being included in the scanned image and including at least part of the image indicative of the sheet; and
   executing a correction on each of N partial areas.

9. The image processing apparatus according to claim 1, wherein the computer executable instructions further perform steps of determining a first polygonal line and a second polygonal line from the scanned image, the first polygonal line approximating one edge line of the plurality of edge lines and being comprised of N line segments, N being an integer greater than or equal to 2, the second polygonal line approximating another edge line of the plurality of edge lines and being comprised of N line segments, the one edge line corresponding to one side of the plurality of sides of the sheet, the another edge line corresponding to another side of the plurality of sides of the sheet, the one side and the another side extending in a direction that corresponds to a conveying direction in which the sheet is to be conveyed, each of the first polygonal line and the second polygonal line having two end points and (N−1) intermediate vertices each connecting adjacent two line segments of the N line segments, the (N−1) intermediate vertices of the first polygonal line corresponding to the (N−1) intermediate vertices of the second polygonal line, respectively;
   wherein the scan data is corrected by:
      dividing the target area into N partial areas by (N−1) lines, each of the (N−1) lines passing through each intermediate vertex of the first polygonal line and corresponding one intermediate vertex of the second polygonal line, the target area being at least part of the image indicative of the sheet; and
      executing a correction on each of the N partial areas.

10. The image processing apparatus according to claim 9, wherein N is 2,
   wherein the plurality of edge lines includes a first edge line and a second edge line, the first edge line being a straight line corresponding to a first side, the second edge line being a straight line corresponding to a second side, the first side and the second side being included in the plurality of sides and extending in a direction corresponding to a direction perpendicular to the conveying direction, each of the first edge line and the second edge line having one end point and another end point upstream of the one end point in the direction corresponding to the direction perpendicular to the conveying direction;
   wherein the target area is encompassed by the first edge line, the second edge line, the first polygonal line, and the second polygonal line, the first polygonal line having a first line segment and a second line segment and one intermediate vertex connecting the first line segment and the second line segment, the first line segment extending perpendicularly to the first edge line toward the second edge line from the one end point of the first edge line, the second line segment extending perpendicularly to the second edge line toward the first edge line from the one end point of the second edge line, the second polygonal line having a third line segment and a fourth line segment and one intermediate vertex connecting the third line segment and the fourth line segment, the third line segment extending perpendicularly to the first edge line toward the second edge line from the another end point of the first edge line, the fourth line segment extending perpendicularly to the second edge line toward the first edge line from the another end point of the second edge line;
   wherein the target area is divided into two partial areas by one line passing through the one intermediate vertex of the first polygonal line and the one intermediate vertex of the second polygonal line;
   wherein the correction is executed on each of two partial areas to change a shape of the target area to a rectangular shape.

11. The image processing apparatus according to claim 10, wherein the computer executable instructions further perform steps of:
   determining whether a distance between the one intermediate vertex of the first polygonal line and the one edge line is greater than prescribed update threshold;
   updating, when the distance is greater than the prescribed update threshold, the first polygonal line by determining a fifth line segment passing through an intermediate point of the first line segment and an intermediate point of the second line segment, the updated first polygonal line including the a part of the first line segment, the fifth line segment, and a part of the second line segment;
   updating, when the distance is greater than the prescribed update threshold, the second polygonal line by determining a sixth line segment passing through an intermediate point of the third line segment and an intermediate point of the fourth line segment, the updated second polygonal line including the a part of the third line segment, the sixth line segment, and a part of the fourth line segment; and
   updating two partial areas to three partial areas by dividing the target area into the three partial areas by using both: a line connecting a vertex through which the first line segment and the fifth line segment pass and a vertex through which the third line segment and the sixth line segment pass; and a line connecting a vertex through which the fifth line segment and the second line segment pass and a vertex through which the sixth line segment and the fourth line segment pass.

12. The image processing apparatus according to claim 10, wherein the computer executable instructions further perform steps of:
- determining whether an inclination angle between the first line segment and the second line segment is greater than prescribed update threshold;
- updating, when the inclination angle is greater than the prescribed update threshold, the first polygonal line by determining a fifth line segment passing through an intermediate point of the first line segment and an intermediate point of the second line segment, the updated first polygonal line including the a part of the first line segment, the fifth line segment, and a part of the second line segment;
- updating, when the inclination angle is greater than the prescribed update threshold, the second polygonal line by determining a sixth line segment passing through an intermediate point of the third line segment and an intermediate point of the fourth line segment, the updated second polygonal line including the a part of the third line segment, the sixth line segment, and a part of the fourth line segment; and
- updating two partial areas to three partial areas by dividing the target area into the three partial areas by using both: a line connecting a vertex through which the first line segment and the fifth line segment pass and a vertex through which the third line segment and the sixth line segment pass; and a line connecting a vertex through which the fifth line segment and the second line segment pass and a vertex through which the sixth line segment and the fourth line segment pass.

13. The image processing apparatus according to claim 1, wherein the computer executable instructions further perform steps of correcting tilt of the plurality of edges in the scanned image when the plurality of edge lines is determined not to include a non-linear edge line.

14. The image processing apparatus according to claim 1, wherein the plurality of edge lines includes a pair of first edge lines and a pair of second edge lines, the pair of first edge lines representing a pair of first sides that extend in a first direction, the first direction corresponding to a conveying direction in which the sheet is to be conveyed, each of the pair of first edge lines being a non-linear edge line, the pair of second edge lines representing a pair of second sides that extend in a second direction corresponding to a direction perpendicular to the conveying direction, each of the pair of second edge lines being a straight line that connects the pair of first edge lines, one edge line of the pair of second edge lines extending in a third direction, another edge line of the pair of second edge lines extending in a fourth direction different from the third direction;
- wherein the scan data is corrected by:
  - changing the pair of second edge lines to a pair of linear edge lines parallel to each other by aligning the another edge line with the one edge line;
  - changing the pair of first edge lines to a pair of linear edge lines each connecting the one edge line and the another edge line that has been aligned.

15. The image processing apparatus according to claim 1, further comprising:
- a conveying mechanism configured to convey the sheet in the conveying direction; and
- a sensor configured to optically read the sheet, the scan data being generated by using results of reading the sheet that is being conveyed by the conveying mechanism.

16. A non-transitory computer-readable storage medium storing a set of program instructions executed by a computer, the program instructions comprising:
- acquiring scan data from a scan data generating unit, the scan data generating unit being configured to generate the scan data by optically reading a sheet being conveyed, the scan data representing a scanned image that includes an image indicative of the sheet, the sheet having a plurality of sides;
- detecting a plurality of edge lines from the scanned image by analyzing the scan data, the plurality of edge lines representing the plurality of sides, respectively;
- determining whether the plurality of edge lines include a non-linear edge line; and
- correcting, when the plurality of edge lines is determined to include a non-linear edge line, the scan data so that the non-linear edge line is changed to a linear edge line.

17. A non-transitory computer-readable storage medium storing a set of program instructions executed by a computer, the program instructions comprising:
- acquiring scan data from a scan data generating unit, the scan data generating unit being configured to generate the scan data by optically reading a sheet being conveyed, the scan data representing a scanned image that includes an image indicative of the sheet, the sheet having a plurality of sides;
- detecting a plurality of edge lines from the scanned image by analyzing the scan data, the plurality of edge lines representing the plurality of sides, respectively, the plurality of edge lines including a pair of first edge lines and a pair of second edge lines, the pair of first edge lines representing a pair of first sides that extend in a first direction, the first direction corresponding to a conveying direction in which the sheet is to be conveyed, each of the pair of first edge lines being a non-linear edge line, the pair of second edge lines representing a pair of second sides that extend in a second direction corresponding to a direction perpendicular to the conveying direction, each of the pair of second edge lines being a straight line that connects the pair of first edge lines, one edge line of the pair of second edge lines extending in a third direction, another edge line of the pair of second edge lines extending in a fourth direction different from the third direction;
- determining whether the plurality of edge lines include a non-linear edge line; and
- correcting, when the plurality of edge lines is determined to include a non-linear edge line, the scan data by:
  - changing the pair of second edge lines to a pair of linear edge lines parallel to each other by aligning the another edge line with the one edge line; and
  - changing the pair of first edge lines to a pair of linear edge lines each connecting the one edge line and the another edge line that has been aligned.

18. The non-transitory computer-readable storage medium according to claim 17, wherein the correcting corrects the scan data to generate corrected scan data, the corrected scan data representing a corrected scanned image in which the aligned one edge line and the aligned another edge line are separated from each other by a distance equal to an average length of the pair of first edge lines.

* * * * *